US012747354B2

(12) United States Patent
Cannon et al.

(10) Patent No.: US 12,747,354 B2
(45) Date of Patent: Sep. 29, 2026

(54) POLYMER COMPOSITIONS COMPRISING ALKYL SILICONE AND ARTICLES FORMED FROM SAME

(71) Applicant: CORNING INCORPORATED, Corning, NY (US)

(72) Inventors: Madeline Stavriana Cannon, Dover, NH (US); Amy Claire Kauffman, Hightstown, NJ (US); Laura Bridget Kender, Kittery, ME (US); Gregory Roger Martin, Acton, ME (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 19/309,159

(22) Filed: Aug. 25, 2025

(65) Prior Publication Data

US 2025/0388753 A1 Dec. 25, 2025

Related U.S. Application Data

(63) Continuation of application No. PCT/US2025/020150, filed on Mar. 17, 2025.

(60) Provisional application No. 63/769,721, filed on Mar. 10, 2025, provisional application No. 63/769,712, filed on Mar. 10, 2025, provisional application No. 63/710,186, filed on Oct. 22, 2024, provisional application No. 63/702,451, filed on Oct. 2, 2024, provisional application No. 63/650,679, filed on May 22, 2024, provisional application No. 63/566,611, filed on Mar. 18, 2024.

(51) Int. Cl.
*C08L 83/06* (2006.01)

(52) U.S. Cl.
CPC .......... *C08L 83/06* (2013.01); *C08L 2203/02* (2013.01)

(58) Field of Classification Search
CPC ............................ C08L 2203/02; C08L 83/06
See application file for complete search history.

(56) References Cited

U.S. PATENT DOCUMENTS

| | | | |
|---|---|---|---|
| 8,785,556 | B2 | 7/2014 | Brown |
| 10,308,898 | B2 | 6/2019 | Sworen et al. |
| 2004/0176538 | A1 | 9/2004 | Couturier |

(Continued)

FOREIGN PATENT DOCUMENTS

| | | | |
|---|---|---|---|
| CN | 117209893 | A | 12/2023 |
| EP | 1641555 | B1 | 12/2020 |

(Continued)

OTHER PUBLICATIONS

WO 2023171578 (Year: 2023).*

(Continued)

*Primary Examiner* — Lawrence D Ferguson
(74) *Attorney, Agent, or Firm* — Chandra J Duncan

(57) ABSTRACT

Disclosed herein are polymer compositions including, based on the total weight of the polymer composition, greater than or equal to 0.5 wt. % and less than or equal to 20 wt. % alkyl silicone and a thermoplastic polymer. The alkyl silicone has a molecular weight greater than or equal to 1,000 g/mol and less than or equal to 10,000 g/mol. The alkyl silicone has a dimethyl silicone content greater than or equal to 40 wt. % and less than or equal to 70 wt. %, based on a total weight of the alkyl silicone.

29 Claims, 3 Drawing Sheets

(56) References Cited

U.S. PATENT DOCUMENTS

2005/0048575 A1 3/2005 Coassin et al.

FOREIGN PATENT DOCUMENTS

JP 2022-064159 A 4/2022
WO 2023/160953 A1 8/2023

OTHER PUBLICATIONS

CN 109070129 (Year: 2018).*
International Search Report and Written Opinion of the International Searching Authority; PCT/US2025/020150; dated Jun. 17, 2025; 9 pages; European Patent Office.

* cited by examiner

POLYMER COMPOSITIONS COMPRISING ALKYL SILICONE AND ARTICLES FORMED FROM SAME

CROSS-REFERENCE TO RELATED APPLICATIONS

This application is a continuation application that claims the benefit of priority to International Application No. PCT/US2025/020150, filed Mar. 17, 2025, which claims the benefit of priority under 35 U.S.C. § 119 of U.S. Provisional Application Ser. No. 63/566,611 filed on Mar. 18, 2024, U.S. Provisional Application Ser. No. 63/710,186 filed on Oct. 22, 2024, U.S. Provisional Application Ser. No. 63/769,712 filed on Mar. 10, 2025, U.S. Provisional Application Ser. No. 63/650,679 filed on May 22, 2024, U.S. Provisional Application Ser. No. 63/769,721 filed on Mar. 10, 2025, and U.S. Provisional Application Ser. No. 63/702,451 filed on Oct. 2, 2024, the contents of each of which are relied upon and are incorporated herein by reference in their entireties.

BACKGROUND

Field

The present specification generally relates to polymer compositions and, in particular, to polymer compositions comprising an alkyl silicone that form articles having low fluid retention and/or low binding to biological matter.

Technical Background

Polymeric parts having low fluid retention surfaces may have various applications, such as pipette tips, cell culture ware, assay plates, and liquid handling vessels, among other examples. Conventionally, fluorinated compounds may be added to polymer compositions to reduce fluid retention. However, the use of fluorinated compounds may lead to increased manufacturing times, due to slow surface development of the fluorinated compound. Moreover, the use of fluorinated compounds in polymeric parts is believed to have a negative impact on the environment. Further, polymeric parts having fluorinated compounds in their composition may bind to material of biological origin, decreasing the recovery percentage of biological-based products, which is undesirable.

Therefore, a continuing need exists for polymer compositions for use in forming articles, but that have reduced fluid retention and/or low binding with materials of biological origin.

SUMMARY

Aspect 1. A polymer composition comprising, based on a total weight of the polymer composition, greater than or equal to 0.5 wt. % and less than or equal to 20 wt. % alkyl silicone and a thermoplastic polymer. The alkyl silicone comprises a molecular weight greater than or equal to 1,000 g/mol and less than or equal to 10,000 g/mol; and a dimethyl silicone content greater than or equal 40 wt. % and less than or equal to 70 wt. %, based on a total weight of the alkyl silicone.

Aspect 2. The polymer composition of aspect 1, wherein the molecular weight of the alkyl silicone is greater than or equal to 1,500 g/mol and less than or equal to 8,000 g/mol.

Aspect 3. The polymer composition of aspect 1 or aspect 2, wherein the dimethyl silicone content of the alkyl silicone is greater than or equal to 45 wt. % and less than or equal to 65 wt. %, based on the total weight of the alkyl silicone.

Aspect 4. The polymer composition of any one of aspects 1 to 3, wherein the alkyl silicone comprises $C_8$-$C_{45}$ alkyl groups.

Aspect 5. The polymer composition of aspect 4, wherein the alkyl silicone comprises $C_{12}$-$C_{40}$ alkyl groups.

Aspect 6. The polymer composition of any one of aspects 1 to 5, wherein the alkyl silicone comprises a melting point greater than or equal to 25° C. and less than or equal to 100° C.

Aspect 7. The polymer composition of aspect 6, wherein the alkyl silicone comprises a melting point greater than or equal to 30° C. and less than or equal to 65° C.

Aspect 8. The polymer composition of any one of aspects 1 to 7, wherein the polymer composition comprises, based on the total weight of the polymer composition, greater than or equal to 1 wt. % and less than or equal to 15 wt. % of the alkyl silicone.

Aspect 9. The polymer composition of any one of aspects 1 to 8, wherein the polymer composition comprises, based on the total weight of the polymer composition, greater than or equal to 75 wt. % and less than or equal to 99.5 wt. % of the thermoplastic polymer.

Aspect 10. The polymer composition of any one of aspects 1 to 9, wherein the thermoplastic polymer comprises polypropylene, polystyrene, polymethylmethacrylate, polyvinyl chloride, polycarbonate, polysulfone, polyester, polyamide, polystyrene butadiene copolymers, fully hydrogenated styrenic polymers, polyurethanes, polyethylene, polymethyl pentene, polylactic acid, polybutylene succinate, polyhydroxyalkanoate, or a combination thereof.

Aspect 11. The polymer composition of aspect 10, wherein the thermoplastic polymer comprises polypropylene.

Aspect 12. The polymer composition of any one of aspects 1 to 11, wherein the polymer composition further comprises, based on the total weight of the polymer composition, greater than 0 wt. % and less than or equal to 5 wt. % of one or more additives.

Aspect 13. The polymer composition of aspect 12, wherein the one or more additives are selected from the group consisting of an antioxidant, a clarifying agent, a nucleating agent, an antistatic agent, a colorant, a radiation stability agent, and a conductive agent.

Aspect 14. The polymer composition of any one of aspects 1 to 13, wherein the polymer composition is free or substantially free of fluorine.

Aspect 15. An article comprising the polymer composition of any one of aspects 1 to 14.

Aspect 16. The article of aspect 15, wherein the article comprises a first major surface and a second major surface opposite the first major surface, wherein a concentration of the alkyl silicone at a depth from 0 nm to 10 nm from the first major surface is greater than a concentration of the alkyl silicone at a midpoint between the first major surface and the second major surface.

Aspect 17. The article of aspect 15 or aspect 16, wherein the article comprises a pipette tip, an assay plate, a cell culture dish, a liquid storage vessel, a tube, a liquid receptacle, or a laboratory consumable.

Aspect 18. The article of aspect 17, wherein the article comprises the pipette tip.

Aspect 19. The article of any one of aspects 15 to 18, wherein the article comprises a fluid retention less than or equal to 11% after a single aspirate/dispense cycle.

Aspect 20. The article of any one of aspects 15 to 19, wherein the article comprises a fluid retention greater than 7% less than a similar article lacking alkyl silicone.

Aspect 21. The article of any one of aspects 15 to 20, wherein the article, after exposure to a polar solvent, comprises a fluid retention greater than or equal to 90% less than a similar article a similar article lacking the alkyl silicone after exposure to the polar solvent.

Aspect 22. The article of aspect 21, wherein the polar solvent comprises one or more of ethanol, isopropyl alcohol, and dimethyl sulfoxide.

Aspect 23. The article of any one of aspects 15 to 22, wherein the article is a sterilized article and comprises a fluid retention less than or equal to 11% after a single aspirate/dispense cycle.

Aspect 24. The article of any one of aspects 15 to 22, wherein the article is a sterilized article aged for 14 days at 55° C. and comprises a fluid retention of less than or equal to 11% after a single aspirate/dispense cycle.

Aspect 25. The article of any one of aspects 15 to 24, wherein the article comprises a protein recovery greater than 6% greater than a similar article lacking alkyl silicone.

Aspect 26. The article of any one of aspects 15 to 25, wherein the article comprises a protein recovery greater than or equal to 63%.

Aspect 27. The article of any one of aspects 15 to 26, wherein the article comprises a DNA recovery within 10% of a DNA recovery of a similar article lacking alkyl silicone.

Aspect 28. The article of any one of aspects 15 to 27, wherein the article comprises a DNA recovery greater than or equal to 75%.

Aspect 29. The article of any one of aspects 15 to 28, wherein the article comprises a haze less than 25%.

Aspect 30. The article of any one of aspects 15 to 28, wherein the article comprises a haze greater than or equal to 25% and less than or equal to 50%.

Aspect 31. The article of any one of aspects 15 to 28, wherein the article comprises a haze greater than 50%.

Aspect 32. The article of any one of aspects 15 to 31, wherein the article comprises a haze less than or equal to 215% greater than a similar article lacking the alkyl silicone.

Aspect 33. A method of forming an article comprising a polymer composition, the method comprising solidifying the polymer composition within a mold to form the article and removing the article from the mold. The polymer composition comprises, based on a total weight of the polymer composition, greater than or equal to 0.5 wt. % and less than or equal to 20 wt. % alkyl silicone and a thermoplastic polymer. The alkyl silicone comprises, a molecular weight greater than or equal to 1,000 g/mol and less than or equal to 10,000 g/mol, and a dimethyl silicone content greater than or equal 40 wt. % and less than or equal to 70 wt. % dimethyl silicone, based on a total weight of the alkyl silicone.

Aspect 34. The method of aspect 33, the method further comprising injecting the polymer composition into the mold.

Aspect 35. The method of aspect 33, the method further comprising forming the polymer composition within the mold by coating at least a portion of the mold with the alkyl silicone and subsequently disposing the thermoplastic polymer into the mold.

Aspect 36. A non-fluorinated article comprising a polymer composition, wherein the non-fluorinated article comprises a fluid retention of less than or equal to 11% after a single aspirate/dispense cycle, wherein the non-fluorinated article is resistant to polar solvents, and wherein the non-fluorinated article is free or substantially free of fluorine.

Aspect 37. The non-fluorinated article of aspect 36, wherein the polymer composition comprises greater than or equal to 0.5 wt. % and less than or equal to 20 wt. % of an alkyl containing molecule, based on the total weight of the polymer composition.

Aspect 38. The non-fluorinated article of aspect 37, wherein the alkyl containing molecule is an alkyl silicone.

Aspect 39. The non-fluorinated article of aspect 38, wherein the alkyl silicone comprises a molecular weight greater than or equal to 1,000 g/mol and less than or equal to 10,000 g/mol.

Aspect 40. The non-fluorinated article of aspect 38 or aspect 39, wherein the alkyl silicone comprises a dimethyl silicone content greater than or equal to 40 wt. % and less than or equal to 70 wt. %, based on a total weight of the alkyl silicone.

Aspect 41. The non-fluorinated article of any one of aspects 37 to 40, wherein the alkyl containing molecule comprises $C_8$-$C_{45}$ alkyl groups.

Aspect 42. The non-fluorinated article of any one of aspects 36 to 41, wherein the polymer composition comprises, based on the total weight of the polymer composition, greater than or equal to 75 wt. % and less than or equal to 99.5 wt. % of a thermoplastic polymer.

Aspect 43. The non-fluorinated article of aspect 42, wherein the thermoplastic polymer comprises polypropylene.

Aspect 44. The non-fluorinated article of any one of aspects 36 to 43, wherein the polymer composition further comprises, based on the total weight of the polymer composition, greater than 0 wt. % and less than or equal to 5 wt. % of one or more additives.

Aspect 45. The non-fluorinated article of aspect 44, wherein the one or more additives are selected from the group consisting of an antioxidant, a clarifying agent, a nucleating agent, an antistatic agent, a colorant, a radiation stability agent, and a conductive agent.

Aspect 46. The non-fluorinated article of any one of aspects 36 to 45, wherein the article comprises a pipette tip, an assay plate, a cell culture dish, a liquid storage vessel, a tube, a liquid receptacle, or a laboratory consumable.

Aspect 47. The non-fluorinated article of aspect 46, wherein the article comprises the pipette tip.

Aspect 48. The article of Aspect 15, wherein the article is a 200 μL pipette tip and comprises an amount of fluid retention less than or equal to 4 mg after a single aspirate/dispense cycle with 200 μL of fluid, as measured by gravimetric testing.

Aspect 49. The article of Aspect 15, wherein the article is a sterilized 200 μL pipette tip and comprises an amount of fluid retention less than or equal to 4 mg after a single aspirate/dispense cycle with 200 μL of fluid, as measured by gravimetric testing.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
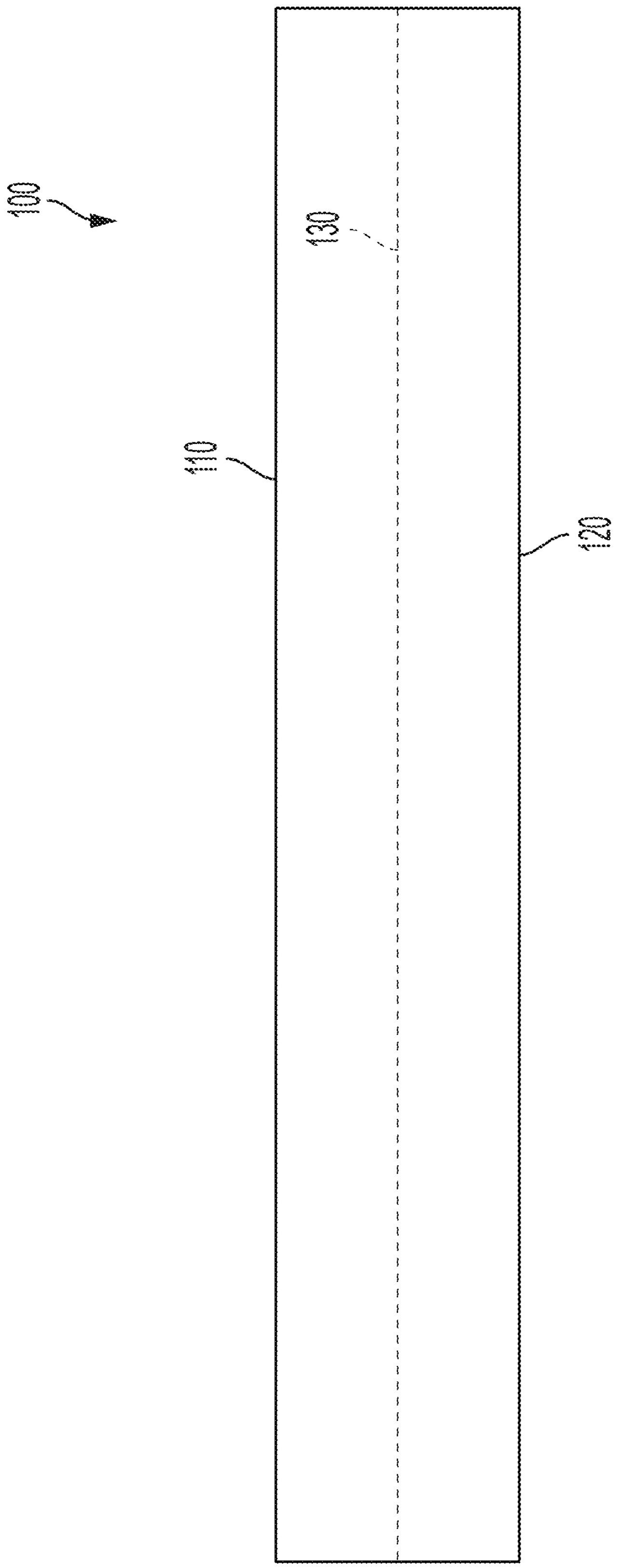
FIG. 1 schematically depicts an article comprising a polymer composition, according to one or more embodiments of the present disclosure.

Reference will now be made in detail to various embodiments of polymer compositions and articles formed from the polymer compositions and having low fluid retention.

According to embodiments, the polymer compositions include an alkyl silicone and a thermoplastic polymer. The alkyl silicone may have a specified molecular weight (e.g., greater than or equal to 1,000 g/mol and less than or equal to 10,000 g/mol) and dimethyl silicone content (e.g. greater than or equal 40 wt. % and less than or equal to 70 wt. % dimethyl silicone, based on a total weight of the alkyl silicone), which results in an article having low fluid retention and low haze.

According to embodiments, a method for forming an article including a polymer composition may comprise solidifying the polymer composition within a mold to form an article and removing the article from the mold. The polymer composition may include an alkyl silicone and a thermoplastic polymer. The polymer composition may include greater than or equal to 0.5 wt. % and less than or equal to 20 wt. % alkyl silicone. The alkyl silicone may have a molecular weight greater than or equal to 1,000 g/mol and less than or equal to 10,000 g/mol. The alkyl silicone may have a dimethyl silicone content greater than or equal to 40 wt. % and less than or equal to 70 wt. %, based on a total weight of the alkyl silicone.

According to embodiments, a non-fluorinated article includes a polymer composition. The non-fluorinated article has a fluid retention of less than or equal to 11%. The non-fluorinated article is resistant to isopropanol, and the non-fluorinated article is free or substantially free of fluorine.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "substantially free," when used to describe the amount and/or absence of a particular component in a composition and the resultant article, means that the component is not intentionally added to the composition and the resultant article. However, the composition and the resultant article may contain traces of the component as a contaminant or tramp in amounts of less than 0.05 weight percent (wt. %).

The term "free," when used to describe the amount and/or absence of a particular component in a composition and the resultant articles, means that the component is not present in the article.

As described herein, polymeric parts (articles) having low fluid retention surfaces and/or surfaces with low binding to biological matter may have various applications, such as pipette tips, centrifuge tubes, cell culture ware, assay plates, and liquid handling vessels, among other examples. As used herein, "biological matter" refers to matter produced by cells such as DNA, proteins, extra cellular matrices, among other examples. It may be desirable to avoid use of fluorinated compounds in polymer compositions to reduce fluid retention due to increased manufacturing times and their negative environmental impact.

Low molecular weight alkyl silicones, such as those with only methyl pendant groups, have also conventionally been used to produce low fluid retention surfaces. However, due to their relatively lower molecular weight, inclusion of such alkyl silicones in polymer compositions may result in an undesirable increase in fluid retention and haze. Moreover, low molecular weight alkyl silicones may be soluble in common reagents, such as isopropyl alcohol, leading to contamination of fluid that contacts the article made of the polymer composition.

Disclosed herein are polymer compositions and articles comprising same that mitigate the aforementioned problems. Specifically, the polymer compositions disclosed herein comprise an alkyl silicone comprising a specified molecular weight (e.g., greater than or equal to 1,000 g/mol and less than or equal to 10,000 g/mol) and silicone content (e.g., greater than or equal 40 wt. % and less than or equal to 70 wt. % silicone, based on a total weight of the alkyl silicone), which results in an article having low fluid retention (e.g., less than or equal to 10%). The specified molecular weight and silicone content of the alkyl silicones described herein ensure separation of the alkyl silicone from the polymer and migration towards the surface of the polymeric part or article being formed during manufacturing. The increased alkyl silicone content on or near the article (polymeric part) surface may result in the article having low fluid retention. The articles formed from the polymer compositions described herein are non-fluorinated articles having low fluid retention. As used herein, a "non-fluorinated article" is an article formed from a polymer composition that is free or substantially free of fluorine.

The polymer compositions described herein may be described as comprising alkyl silicone and a thermoplastic polymer.

The polymer composition may undergo surface development during manufacturing, such that alkyl silicone migrates to the surface of the article formed from the polymer composition. This may contribute to the lower fluid retention properties of articles formed from the polymer composition. However, if the molecular weight of the alkyl silicone is too great, for example greater than 10,000 g/mol, then the alkyl silicone may not migrate to the surface of an article formed from the polymer composition. Furthermore, if the molecular weight of the alkyl silicone is not great enough, for example less than 1,000 g/mol, then the alkyl silicone may be less resistant to certain solvents, such as isopropanol. Low solvent resistance may result in alkyl silicone being removed from the surface of the article, which may lead to contamination of samples. A relatively low or high molecular weight (e.g., less than 1,000 g/mol or greater than 10,000 g/mol) may lead to an increase in haze, which may be undesirable in certain applications.

According to embodiments, the alkyl silicone may have a molecular weight greater than or equal to 1,000 g/mol and less than or equal to 10,000 g/mol. As used herein, "molecular weight" refers to weight average molecular weight. For example, without limitation, the alkyl silicone may have a molecular weight greater than or equal to 1,000 g/mol and less than or equal to 10,000 g/mol, greater than or equal to 2,000 g/mol and less than or equal to 10,000 g/mol, greater than or equal to 3,000 g/mol and less than or equal to 10,000 g/mol, greater than or equal to 4,000 g/mol and less than or equal to 10,000 g/mol, greater than or equal to 5,000 g/mol and less than or equal to 10,000 g/mol, greater than or equal to 6,000 g/mol and less than or equal to 10,000 g/mol, greater than or equal to 7,000 g/mol and less than or equal to 10,000 g/mol, greater than or equal to 8,000 g/mol and less than or equal to 10,000 g/mol, greater than or equal to 9,000 g/mol and less than or equal to 10,000 g/mol, greater than or equal to 1,000 g/mol and less than or equal to 9,000 g/mol, greater than or equal to 1,000 g/mol and less than or equal to 8,000 g/mol, greater than or equal to 1,000 g/mol and less than or equal to 7,000 g/mol, greater than or equal to 1,000 g/mol and less than or equal to 6,000 g/mol, greater than or equal to 1,000 g/mol and less than or equal to 5,000 g/mol, greater than or equal to 1,000 g/mol and less than or equal to 4,000 g/mol, greater than or equal to 1,000 g/mol and less than or equal to 3,000 g/mol, greater than or equal to 1,000 g/mol and less than or equal to 2,000 g/mol, or any range or combination of ranges formed from these endpoints. In some embodiments, the alkyl silicone may have a molecular weight from 1,500 g/mol to 8,000 g/mol.

According to embodiments described herein, an "alkyl silicone" is a polymer comprising repeating units of siloxane, where at least some of the siloxane monomers are functionalized with alkyl groups other than methyl groups. In one or more embodiments, some of the siloxane monomers may comprise dimethyl siloxane. The content of dimethyl siloxane monomers in an alkyl silicone may be referred to as the "dimethyl silicone content" of the alkyl silicone. If the dimethyl silicone content of the alkyl silicone is too low (e.g., less than 40 wt. %), then the alkyl silicone may have difficulty moving to the surface of an article formed from the polymer composition during manufacturing. This may increase manufacturing times and lead to poor fluid retention properties of articles comprising the polymer composition. If the dimethyl silicone content of the alkyl silicone is too great, for example greater than 70 wt. %, then articles formed from the polymer composition may similarly have poor surface development. A relatively high dimethyl silicone content may also increase haze, which may be undesirable in certain applications.

In embodiments, the alkyl silicone may have a dimethyl silicone content of greater than or equal to 40 wt. % and less than or equal to 70 wt. % based on a total weight of the alkyl silicone. For example, the alkyl silicone may have a dimethyl silicone content, based on the total weight of the alkyl silicone, greater than or equal to 40 wt. % and less than or equal to 70 wt. %, greater than or equal to 45 wt. % and less than or equal to 70 wt. %, greater than or equal to 50 wt. % and less than or equal to 70 wt. %, greater than or equal to 55 wt. % and less than or equal to 70 wt. %, greater than or equal to 60 wt. % and less than or equal to 70 wt. %, greater than or equal to 65 wt. % and less than or equal to 70 wt. %, greater than or equal to 40 wt. % and less than or equal to 65 wt. %, greater than or equal to 40 wt. % and less than or equal to 60 wt. %, greater than or equal to 40 wt. % and less than or equal to 55 wt. %, greater than or equal to 40 wt. % and less than or equal to 50 wt. %, greater than or equal to 40 wt. % and less than or equal to 45 wt. %, or any range or combination of ranges formed from these endpoints. In some embodiments, a dimethyl silicone content of the alkyl silicone may be greater than or equal to 45 wt. % and less than or equal to 65 wt. %.

The carbon content of the alkyl groups may affect the compatibility of the alkyl silicone with the thermoplastic polymer used in the polymer composition. If the number of carbon atoms in the alkyl groups of the alkyl silicone is too great, for example greater than 45 carbon atoms, then the alkyl silicone may be too compatible with the thermoplastic polymer and may not migrate to the surface of the formed part. Additionally, the number of carbon atoms in the alkyl groups of the alkyl silicone may contribute to the solvent resistance of articles formed from the polymer composition. If the number of carbon atoms in the alkyl groups is too small, for example less than 8 carbon atoms, then articles formed from the polymer composition may not exhibit sufficient solvent resistance.

In one or more embodiments, the alkyl silicone may comprise $C_8$-$C_{45}$ alkyl groups. As described herein, a "$C_X$ alkyl group" refers to an alkyl group comprising X number of carbon atoms. For example, a $C_8$ carbon group comprises 8 carbon atoms. In embodiments, the alkyl silicone may comprise $C_8$-$C_{45}$ alkyl groups, $C_{10}$-$C_{45}$ alkyl groups, $C_{15}$-$C_{45}$ alkyl groups, $C_{20}$-$C_{45}$ alkyl groups, $C_{25}$-$C_{45}$ alkyl groups, $C_{30}$-$C_{45}$ alkyl groups, $C_{35}$-$C_{45}$ alkyl groups, $C_{40}$-$C_{45}$ alkyl groups, $C_8$-$C_{40}$ alkyl groups, $C_8$-$C_{35}$ alkyl groups, $C_8$-$C_{30}$ alkyl groups, $C_8$-$C_{25}$ alkyl groups, $C_8$-$C_{20}$ alkyl groups, $C_8$-$C_{15}$ alkyl groups, $C_8$-$C_{10}$ alkyl groups, or alkyl groups having a range of the number of carbon atoms formed from any of these endpoints. In some embodiments, the alkyl silicone may comprise $C_{12}$-$C_{40}$ alkyl groups.

The carbon content of the alkyl groups of the alkyl silicone may correlate to a melting point of the alkyl silicone, with a relatively higher carbon content corresponding to a relatively higher melting point. As such, a melting point of the alkyl silicone may contribute to compatibility and solvent resistance, similar to the carbon content of the alkyl groups. According to embodiments described herein, the alkyl silicone may comprise a melting point greater than or equal to 25° C. and less than or equal to 100° C. For example, without limitation, the alkyl silicone may have a melting point greater than or equal to 25° C. and less than or equal to 100° C., greater than or equal to 35° C. and less than or equal to 100° C., greater than or equal to 45° C. and less than or equal to 100° C., greater than or equal to 55° C. and less than or equal to 100° C., greater than or equal to 65° C. and less than or equal to 100° C., greater than or equal to 75° C. and less than or equal to 100° C., greater than or equal to 85° C. and less than or equal to 100° C., greater than or equal to 95° C. and less than or equal to 100° C., greater than or equal to 25° C. and less than or equal to 90° C., greater than or equal to 25° C. and less than or equal to 80° C., greater than or equal to 25° C. and less than or equal to 70° C., greater than or equal to 25° C. and less than or equal to 60° C., greater than or equal to 25° C. and less than or equal to 50° C., greater than or equal to 25° C. and less than or equal to 40° C., greater than or equal to 25° C. and less than or equal to 30° C., or any range or combination of ranges formed from these endpoints. In some embodiments, the alkyl silicone may comprise a melting point greater than or equal to 30° C. and less than or equal to 65° C.

If the amount of alkyl silicone in the polymer composition is too low, for example less than 0.5 wt. %, then articles formed from the polymer composition may not exhibit the desired low fluid retention properties. Additionally, minimizing the amount of alkyl silicone, such as in amounts less than or equal to 20 wt. %, may be cost effective.

Embodiments of the polymer compositions described herein may comprise, based on a total weight of the polymer composition, greater than or equal to 0.5 wt. % and less than or equal to 20 wt. % alkyl silicone. For example, without limitation, the polymer compositions may comprise alkyl silicone in an amount, based on the total weight of the polymer composition, greater than or equal to 0.5 wt. % and less than or equal to 20 wt. %, greater than or equal to 1 wt. % and less than or equal to 20 wt. %, greater than or equal to 3 wt. % and less than or equal to 20 wt. %, greater than or equal to 5 wt. % and less than or equal to 20 wt. %, greater than or equal to 7 wt. % and less than or equal to 20 wt. %, greater than or equal to 9 wt. % and less than or equal to 20 wt. %, greater than or equal to 11 wt. % and less than or equal to 20 wt. %, greater than or equal to 13 wt. % and less than or equal to 20 wt. %, greater than or equal to 15 wt. % and less than or equal to 20 wt. %, greater than or equal to 17 wt. % and less than or equal to 20 wt. %, greater than or equal to 19 wt. % and less than or equal to 20 wt. %, greater than or equal to 0.5 wt. % and less than or equal to 18 wt. %, greater than or equal to 0.5 wt. % and less than or equal to 16 wt. %, greater than or equal to 0.5 wt. % and less than or equal to 14 wt. %, greater than or equal to 0.5 wt. % and less than or equal to 12 wt. %, greater than or equal to 0.5 wt. % and less than or equal to 10 wt. %, greater than or equal to 0.5 wt. % and less than or equal to 8 wt. %, greater than or equal to 0.5 wt. % and less than or equal to 6 wt. %, greater than or equal to 0.5 wt. % and less than or equal to 4 wt. %, greater than or equal to 0.5 wt. % and less than or equal to 2 wt. %, greater than or equal to 0.5 wt. % and less than or equal to 1 wt. %, or any range or combination of ranges formed from these endpoints. In some embodiments, the polymer composition may comprise greater than or equal to 1 wt. % and less than or equal to 15 wt. % alkyl silicone.

In one or more embodiments, the polymer composition may comprise an alkyl containing molecule. As described herein, "alkyl containing molecules" include one or more alkyl groups and a molecular segment that reduces compatibility of the alkyl containing molecule with the thermoplastic polymer. In one or more embodiments, the alkyl containing molecules are alkyl silicones. It should be understood that references to alkyl silicones throughout the description may also be considered to generally refer to "alkyl containing molecules." For example, the polymer composition may comprise greater than or equal to 0.5 wt. % and less than or equal to 20 wt. % of an alkyl containing molecule, based on the total weight of the polymer composition, as described hereinabove with respect to alkyl silicone. Additionally, properties of the alkyl containing molecules may be the same as properties of the alkyl silicones described hereinabove, including the molecular weight, alkyl chain length, and melting point. In some embodiments, the polymer composition may comprise an alkyl containing molecule in place of the alkyl silicone described hereinabove. Without intending to be bound by theory, the molecular segment that reduces compatibility of the alkyl containing molecule with the thermoplastic polymer in which the alkyl containing molecule is blended may aid in migration of the alkyl containing molecules to the surface of an article formed from the polymer composition comprising the alkyl containing molecule and the thermoplastic polymer. For example, alkyl silicones utilize silicone as the compatibility reducing molecular segment that brings the alkyl containing molecule to the surface. The compatibility reducing molecular segment may vary according to the thermoplastic polymer included in the polymer composition such that the compatibility reducing molecular segment is incompatible with the thermoplastic polymer. For example, the silicone of alkyl silicone molecules may be incompatible with a broad range of thermoplastic polymers including, but not limited to polypropylene. However, the compatibility reducing molecular segment is not necessarily limited to silicone.

The thermoplastic polymer included in the polymer compositions described herein is not necessarily limited. For example, the thermoplastic polymer may be selected based on the intended use of the article formed from the polymer composition. In embodiments, the thermoplastic polymer comprises polypropylene, polystyrene, polymethylmethacrylate, polyvinyl chloride, polycarbonate, polysulfone, polyester, polyamide, polystyrene butadiene copolymers, fully hydrogenated styrenic polymers, polyurethanes, polyethylene, polymethyl pentene, polylactic acid, polybutylene succinate, polyhydroxyalkanoate, or a combination thereof. In some embodiments, the thermoplastic polymer may comprise a propylene homopolymer or a propylene ethylene copolymer. In some embodiments, the thermoplastic polymer may comprise polypropylene.

In some embodiments, the thermoplastic polymer may have a melt flow rate greater than or equal to 1 g/10 min. and less than or equal to 100 g/10 min. For example, the thermoplastic polymer may have a melt flow rate greater than or equal to 1 g/10 min. and less than or equal to 100 g/10 min., greater than or equal to 10 g/10 min. and less than or equal to 100 g/10 min., greater than or equal to 20 g/10 min. and less than or equal to 100 g/10 min., greater than or equal to 30 g/10 min. and less than or equal to 100 g/10 min., greater than or equal to 40 g/10 min. and less than or equal to 100 g/10 min., greater than or equal to 50 g/10 min. and less than or equal to 100 g/10 min., greater than or equal to 60 g/10 min. and less than or equal to 100 g/10 min., greater than or equal to 70 g/10 min. and less than or equal to 100 g/10 min., greater than or equal to 80 g/10 min. and less than or equal to 100 g/10 min., greater than or equal to 90 g/10 min. and less than or equal to 100 g/10 min., greater than or equal to 1 g/10 min. and less than or equal to 90 g/10 min., greater than or equal to 1 g/10 min. and less than or equal to 80 g/10 min., greater than or equal to 1 g/10 min. and less than or equal to 70 g/10 min., greater than or equal to 1 g/10 min. and less than or equal to 60 g/10 min., greater than or equal to 1 g/10 min. and less than or equal to 50 g/10 min., greater than or equal to 1 g/10 min. and less than or equal to 40 g/10 min., greater than or equal to 1 g/10 min. and less than or equal to 30 g/10 min., greater than or equal to 1 g/10 min. and less than or equal to 20 g/10 min., greater than or equal to 1 g/10 min. and less than or equal to 10 g/10 min., or any range or combination of ranges formed from these endpoints. As described herein, "melt flow rate" may be measured according to ASTM D1238. Without intending to be bound by theory, polymers having melt flow rates greater than or equal to 1 g/10 min. and less than or equal to 100 g/10 min. may relatively easily fill parts having thin walls and long flow paths while maintaining desirable physical properties.

In embodiments, the polymer composition may comprise, based on the total weight of the polymer composition, greater than or equal to 75 wt. % and less than or equal to 99.5 wt. % of the thermoplastic polymer. For example, without limitation, the polymer composition may comprise thermoplastic polymer in an amount, based on the total weight of the polymer composition, greater than or equal to 75 wt. % and less than or equal to 99.5 wt. %, greater than or equal to 80 wt. % and less than or equal to 99.5 wt. %, greater than or equal to 85 wt. % and less than or equal to 99.5 wt. %, greater than or equal to 90 wt. % and less than or equal to 99.5 wt. %, greater than or equal to 95 wt. % and less than or equal to 99.5 wt. %, greater than or equal to 75 wt. % and less than or equal to 95 wt. %, greater than or equal to 75 wt. % and less than or equal to 90 wt. %, greater than or equal to 75 wt. % and less than or equal to 85 wt. %, greater than or equal to 75 wt. % and less than or equal to 80 wt. %, or any range or combination of ranges formed from these endpoints.

In some embodiments, the polymer composition may further comprise an additional polymer included as a dispersing agent, for example, when the polymer composition is processed in equipment that may not disperse the polymer composition well. For example, in embodiments, the additional polymer may comprise a polymer with a melting temperature and viscosity lower than that of the main polymer being utilized to mold the part being manufactured. The polymer may have a lower molecular weight than the main polymer to reduce the melt viscosity and may be a copolymer to allow for compatibility with the main resin while reducing the melting temperature. For example, for a polypropylene part, the polymer may be a random copolymer of propylene and ethylene. For a polystyrene part, the polymer may be a copolymer of styrene and butadiene which may or may not be hydrogenated. In embodiments, the polymer composition may comprise, based on the total weight of the polymer composition, greater than or equal to 0 wt. % and less than or equal to 12 wt. % of the additional polymer. For example, without limitation, the polymer composition may comprise the additional polymer in an amount, based on the total weight of the polymer composition, greater than or equal to 0 wt. % and less than or equal to 12 wt. %, greater than or equal to 0 wt. % and less than or equal to 10 wt. %, greater than or equal to 0 wt. % and less than or equal to 7 wt. %, greater than or equal to 0 wt. % and less than or equal to 5 wt. %, greater than or equal to 1 wt. % and less than or equal to 12 wt. %, greater than or equal to 1 wt. % and less than or equal to 10 wt. %, greater than or equal to 1 wt. % and less than or equal to 7 wt. %, greater than or equal to 1 wt. % and less than or equal to 5 wt. %, greater than or equal to 2 wt. % and less than or equal to 12 wt. %, greater than or equal to 2 wt. % and less than or equal to 10 wt. %, greater than or equal to 2 wt. % and less than or equal to 7 wt. %, greater than or equal to 2 wt. % and less than or equal to 5 wt. %, or any range or combination of ranges formed from these endpoints.

In some embodiments, the polymer composition may further comprise one or more additives. The additives that may be included in the polymer composition are not necessarily limited. In embodiments, the additives may comprise antioxidants, clarifying agents, nucleating agents, antistatic agents, colorants, radiation stability agents, and conductive agents. Antioxidants may be included in the polymer composition to prevent degradation of the polymers. Some embodiments of the polymer composition include multiple antioxidants. Clarifying agents and nucleating agents may improve the clarity of articles formed from the polymer composition. Without intending to be bound by theory, clarifying agents and nucleating agents may initiate the growth of crystalline phases of crystalline polymers, such as polypropylene. Increasing the number of relatively small crystalline structures in the article may reduce the light scattered by the crystalline phases improving the clarity of articles formed from the polymer composition. Antistatic agents may reduce the resistivity of the polymer composition to provide static protection. Colorants may be included in the polymer composition to impart color to articles formed form the polymer composition. Suitable colorants may be selected for use in transparent, translucent, or opaque articles. Radiation stability agents may be included in the polymer composition to reduce the effects of irradiation on the polymer composition. For example, radiation stability agents may reduce discoloration, such as yellowing, that may occur in some polymer compositions. Radiation stability agents may also reduce the effect of radiation on the mechanical properties of articles formed from the polymer composition. Conductive agents may be included in the polymer composition to improve the electrical conductivity of the polymer composition. Conductive agents may include, for example, carbon black and carbon fibers. Some conductive agents, such as carbon black, may also impart color to the polymer composition and articles formed from the polymer composition.

In embodiments where the polymer composition further comprises one or more additives, the polymer composition may comprise, based on the total weight of the polymer composition, greater than 0 wt. % and less than or equal to 5 wt. % of the one or more additives. For example, the polymer composition may comprise the one or more additives in an amount greater than 0 wt. % and less than or equal to 5 wt. %, greater than or equal to 0.5 wt. % and less than or equal to 5 wt. %, greater than or equal to 1 wt. % and less than or equal to 5 wt. %, greater than or equal to 1.5 wt. % and less than or equal to 5 wt. %, greater than or equal to 2 wt. % and less than or equal to 5 wt. %, greater than or equal to 2.5 wt. % and less than or equal to 5 wt. %, greater than or equal to 3 wt. % and less than or equal to 5 wt. %, greater than or equal to 3.5 wt. % and less than or equal to 5 wt. %, greater than or equal to 4 wt. % and less than or equal to 5 wt. %, greater than or equal to 4.5 wt. % and less than or equal to 5 wt. %, greater than 0 wt. % and less than or equal to 4.5 wt. %, greater than 0 wt. % and less than or equal to 4 wt. %, greater than 0 wt. % and less than or equal to 3.5 wt. %, greater than 0 wt. % and less than or equal to 3 wt. %, greater than 0 wt. % and less than or equal to 2.5 wt. %, greater than 0 wt. % and less than or equal to 2 wt. %, greater than 0 wt. % and less than or equal to 1.5 wt. %, greater than 0 wt. % and less than or equal to 1 wt. %, greater than 0 wt. % and less than or equal to 0.5 wt. %, or any range or combination of ranges formed from these endpoints. In embodiments, the polymer composition may be free or substantially free of additives.

In one or more embodiments, the polymer composition may be free or substantially free of fluorine. For example, the alkyl silicone may be free from any moieties or functionalities comprising fluorine. Likewise, the thermoplastic polymer may be free from any moieties or functionalities comprising fluorine. In embodiments where the polymer composition comprises one or more additives, the additives may each be free from fluorine. Without intending to be bound by theory, articles formed from polymer compositions that are free of fluorine may have reduced manufacturing times relative to articles formed from polymer compositions comprising fluorinated compounds. Furthermore, fluorinated compound in articles formed from polymer compositions that are used to handle biological samples may contaminate the biological samples. Using polymer compositions that are free from fluorine to form such articles may reduce the likelihood of such samples being contaminated. Additionally, in certain industries, it may be desirable to avoid fluorinated compounds due to their potential environmental impact.

Embodiments of the polymer compositions described herein may be used to form various articles. Such articles may comprise the polymer compositions previously described. In some embodiments, the articles may be formed from the polymer compositions. In some embodiments, the articles may consist essentially of the polymer composition.

The articles comprising the polymer composition are not necessarily limited. In one or more embodiments, the articles may comprise a pipette, pipette tip, an assay plate, a dish, plate, flask, or other vessel for cell culture, a liquid storage vessel, a tube, a liquid receptacle, or a laboratory consumable. As described herein, a "laboratory consumable" refer to any item for laboratory use that is replaced regularly after it is used or after it wears down. The article may be any article where low fluid retention is desirable. In some embodiments, the article comprises a pipette tip. As described hereinabove, articles formed from the polymer compositions may have low fluid retention and sufficient solvent resistance. These properties may be desirable for laboratory consumables, such as pipette tips.

Referring now to FIG. 1, an article 100 comprising the polymer composition may comprise a first major surface 110 and a second major surface 120. The second major surface 120 may be opposite the first major surface 110. It should be noted that the shape of the article is not necessarily limited to the structure depicted in FIG. 1. Articles comprising the polymer composition may have any suitable form or shape. For example, the polymer composition may be shaped to form any of the articles described hereinabove.

In one or more embodiments, a concentration of the alkyl silicone at a depth from 0 nm to 10 nm from the first major surface 110 of the article 100 may be greater than a concentration of alkyl silicone at a midpoint 130 between the first major surface 110 and the second major surface 120 of the article 100. In such embodiments, the midpoint 130 between the first major surface 110 and the second major surface 120 is greater than 10 nm from the first major surface. In one or more embodiments, the concentration of the alkyl silicone at a depth from 0 nm to 10 nm from the first major surface 110 of the article 100 may be 2, 3, 5, 10, 15 or even 20 times greater than a concentration of alkyl silicone at a midpoint 130 between the first major surface 110 and the second major surface 120 of the article 100. Likewise, in one or more embodiments, the concentration of the alkyl silicone at a depth from 0 nm to 10 nm from the second major surface 120 of the article 100 may be greater than a concentration of the alkyl silicone at the midpoint 130 between the first major surface 110 and the second major surface 120 of the article 100. In such embodiments, the midpoint 130 between the first major surface 110 and the second major surface 120 is greater than 10 nm. In one or more embodiments, the concentration of the alkyl silicone at a depth from 0 nm to 10 nm from the second major surface 120 of the article 100 may be 2, 3, 5, 10, 15 or even 20 times greater than a concentration of alkyl silicone at a midpoint 130 between the second major surface 120 and the second major surface 120 of the article 100. The concentration of the alkyl silicone at a depth from 0 nm to 10 nm may be measured by x-ray photoelectron spectroscopy.

This difference in concentration of alkyl silicone between the surfaces of the article and the middle of the article may be achieved in several ways. For example, during manufacturing processes, alkyl silicone may separate from the thermoplastic polymer and migrate to the surface of the article formed from the polymer composition. In another example, the polymer composition may be formed within a mold for making an article, where the alkyl silicone coats the surface of the mold and the thermoplastic polymer is subsequently introduced to the mold. When the article is formed, the concentration of alkyl silicone may be greater on the surface of the article. Without intending to be bound by theory, increasing the concentration of alkyl silicone on the surface of an article may improve the fluid retention properties of the article; specifically, reducing the fluid retention of the article.

In one or more embodiments, the article may comprise a fluid retention of less than or equal to 11% of a volume of fluid aspirated (or otherwise added) in the article and then dispensed (or otherwise discarded), including at any value or in any range less than or equal to 11%. For example, the article may comprise a fluid retention of less than or equal to 11%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, 0.1%, or even 0%, of a volume aspirated (or otherwise added) in the article and then dispensed (or otherwise discarded). When the article is in the form of a pipette tip, the article may comprise a fluid retention of less than or equal or equal to 11% after a single aspirate/dispense cycle, including at any value between 11% and 0% or in any range between 11% and 0%. As described herein, "fluid retention" for a pipette tip is measured by the following method. A solution may be formed by adding a fluorescein sodium salt to a solvent, such that the concentration of the fluorescein sodium salt is 1 μg/ml. The solvent may be 70 vol. % ethanol and 30 vol. % cell culture grade water (70:30 EtOH/water). A 100 μL volume of the fluorescein solution is drawn into a 200 μL pipette tip. The solution is then dispensed from the pipette tip. The fluid remaining on the used tip surface is recovered in wash water by aspirating the used pipette tip with 100 μL of deionized water that is placed in one well of a 96-well plate and dispensing it back into the same well. This wash step (a rinse) is repeated two more times using the same 100 μL used wash water volume. The absorbance of the fluorescence of the resultant dispensed wash water is then measured in arbitrary fluorescence units (AFU) using a fluorescent plate reader set at 480 nm wavelength and the value is recorded as the rinse solution AFUs. The absorbance in AFU at 480 nm wavelength of the 1 μg/fluorescein solution, the 70% ethanol (EtOH) and 30% water solution (70:30 EtOH/water), and a 100% water solution are also measured. To remove any artifact of the 70:30 EtOH solvent on the 1 μg/fluorescein solution, the value of AFUs for the 70:30 EtOH solvent is subtracted from the value of AFUs for the 1 μg/fluorescein solution and the resultant value is recorded as the Aspirated AFUs. Likewise, to remove any artifact of the wash water itself on the rinse fluid, the value of the AFUs for the 100% water solution is subtracted from the value of the AFUs for the rinse solution and the resultant value is recorded as the Retained AFUs. The fluid retention of the pipette tip is calculated by dividing the Retained AFUs by the Aspirated AFUs, and then multiplying the resultant value by 100%.

The method for measuring the fluid retention of a pipette tip is used and described in detail in the Examples of the present disclosure. The pipette tip is washed by drawing 100 μL of deionized water into the pipette tip and dispensing the water from the pipette tip. It should be understood that the fluid retention of a pipette tip may be measured after any given aspirate/dispense cycle. For example, in the Examples of the present disclosure, the pipette tip is subjected to three aspirate/dispense cycles, with washing occurring in between each cycle. The fluid retention of a pipette tip may be measured after any one of the first, second, third, fourth, fifth, or any subsequent aspirate/dispense cycles. In some embodiments, a pipette tip may comprise a fluid retention of less than or equal to 11%, 10%, 9%, 8%, 7%, 6%, 5%, 4%, 3%, 2%, 1% or even 0% after the first aspirate/dispense cycle.

The fluid retention of an article comprising the polymer composition may be greater than 7% less than a similar article lacking the alkyl silicone. As described herein, a "similar article lacking the alkyl silicone" refers to an article that is identical to the article comprising the polymer composition in both structure and composition, except that the alkyl silicone content of the polymer composition is replaced with the thermoplastic polymer in the "similar article lacking the alkyl silicone." In some embodiments, the fluid retention of an article comprising the polymer composition described herein may be greater than 7%, 10%, 15%, 20%, 25%, 30%, 35%, 40%, 45%, 50%, 55%, 60%, 65%, 70%, 75%, 80%, or even 85% less than a similar article lacking the alkyl silicone. In some embodiments, the fluid retention of a pipette tip comprising the polymer composition described herein may be greater than 7%, 10%, 15%, 20%, 25%, 30%, 35%, 40%, 45%, 50%, 55%, 60%, 65%, 70%, 75%, 80%, or even 85% less than a similar pipette tip lacking the alkyl silicone after the first aspirate/dispense cycle.

Further, as described herein, the "amount of fluid retention" for a pipette tip is measured by the following method using gravimetric testing. A solution may be formed by adding 50 wt. % of glycerol, 40 wt. % McCormick® green food dye (or equivalent), and 10 wt. % deionized water. An article formed from a polymer composition is weighed for mass using a mass balance scale having at least three decimal places and the measurement is recorded (i.e., the pre-cycle mass). The pipette tip is added to a pipettor and then a single cycle of drawing up the described solution (aspirating) and then dispensing it is performed, referred to as an aspirate/dispense cycle. The pipette tip is then removed from the pipettor and re-weighed, and the measurement is recorded (i.e., the post-cycle mass). The pre-cycle mass is subtracted from the post-cycle mass and that difference in mass is the amount of fluid retained by the tip. Pipette tips formed from the polymer compositions described herein that have a gravimetric testing amount less than or equal to 6 mg per 200 μL of the described solution in a 200 μL pipette tip after a single aspirating dispensing cycle are considered to have a low amount of fluid retention.

In some embodiments, the amount of fluid retention in a 200 μL pipette tip formed from the polymer compositions described herein is less than or equal to 10.0 mg, 9.0 mg, 8.0 mg, 7.0 mg, 6.0 mg, 5.0 mg, 4.0 mg, 3.0 mg, 2.0 mg, 1.9 mg, 1.8 mg, 1.7 mg, 1.6 mg, 1.5 mg, 1.4 mg, 1.3 mg, 1.2 mg, 1.1 mg, 1.0 mg, 0.9 mg, 0.8 mg, 0.7 mg, 0.6 mg, 0.5, 0.4 mg, 0.3 mg, 0.2 mg, or 0.1 mg per 200 μL of a solution comprising 50 wt. % of glycerol, 40 wt. % McCormick® green food dye (or equivalent), and 10 wt. % deionized water, after a single aspirating dispensing cycle, as measured with gravimetric testing. In one specific embodiment, the amount of fluid retention in a 200 μL pipette tip formed from the polymer compositions described herein is less than or equal to 4 mg per 200 μL of a solution comprising 50 wt. % of glycerol, 40 wt. % McCormick® green food dye (or equivalent), and 10 wt. % deionized water, after a single aspirate/dispense cycle, as measured with gravimetric testing.

In addition to relatively low fluid retention, the articles comprising the polymer composition may have a relatively low bind. As used in the present disclosure "bind" refers to the retention of solutes on the surface of the article. For example, without limitation, some biological samples in solution, such as protein or DNA, may be retained on surfaces of various laboratory consumables, such as pipette tips. Even if the fluid retention of the pipette tip is low, such that little to no solvent is retained by the pipette tip, the solute, such as protein or DNA, may bind to the wall of the pipette tip and be retained if the pipette tip has a relatively high bind. Embodiments of articles comprising the polymer composition may have a low bind, which may reduce the retention of certain materials on the articles. Without intending to be bound by theory, reducing the surface charge or oxidation of an article may reduce interactions between the article and biomolecules. Staining agents, such as ethidium bromide for DNA or colloidal gold for proteins, may be used to demonstrate reduced biomolecule binding to the surface of articles comprising the polymer composition. Reduced biomolecule binding correlates to increase protein and DNA recovery.

In one or more embodiments, the article may comprise a protein recovery of greater than or equal to 63%. For example, the article may comprise a protein recovery greater than or equal to 63%, 65%, 67%, 69%, or even 71%. As described herein, "protein recovery" for a pipette tip is measured by the following method. 200 μL of a bovine serum albumin (BSA) sample (5 μg/ml) is drawn into a pipette tip. The BSA sample is held in the pipette tip for 10 minutes and then dispensed from the pipette tip and measured by a microBCA assay. "BCA" refers to bicinchoninic acid. The protein remaining in the BSA sample after being dispensed from the pipette tip relative to the protein concentration of the initial BSA sample, referred to as "protein recovery," is then calculated.

In embodiments, the articles comprising the polymer composition as described herein may have improved protein recovery as compared to a similar article lacking alkyl silicone. In some embodiments, the protein recovery of the article comprising the polymer composition may be greater than 6%, 8%, 10%, 12%, or even 14% greater than a similar article lacking the alkyl silicone.

In one or more embodiments, the article may comprise a DNA recovery greater than or equal to 75%. For example, the article may comprise a DNA recovery greater than or equal to 75%, 80%, 85%, 90%, or even 95%. As described herein, "DNA recovery" for a pipette tip is measured by the following method. 200 of μL of a salmon sperm DNA solution (20 ng/ml) having DNA sheared to about 80-500 base pairs is drawn into a pipette tip. The sample is held in the pipette tip for 10 minutes and then dispensed from the pipette tip and measured with a high sensitivity dsDNA assay kit (Qubit HS ds NDA assay kit or the like). The salmon sperm DNA remaining in the sample after being dispensed from the pipette tip relative to the concentration of the salmon sperm DNA in the initial salmon sperm DNA sample, referred to as "DNA recovery," is then calculated.

In embodiments, the articles comprising the polymer composition as described herein may have maintained DNA recovery as compared to a similar article lacking alkyl silicone. In some embodiments, the DNA recovery of the article comprising the polymer composition may be within 10%, 8%, 6%, 4%, or even 2% the DNA recovery a similar article lacking the alkyl silicone.

Embodiments of articles comprising the polymer composition may be transparent, translucent, or opaque. Some articles comprising the polymer composition may benefit from transparency. For example, in some embodiments, pipette tips may be transparent. In some embodiments, pipette tips may be translucent. Other articles may benefit from opacity, such as storage containers. Some articles, such as tubing may be transparent, translucent, or opaque depending on the desired use for the tubing. The term "transparent," when used to describe an article herein, refers to an article that has a haze less than 25%. The term "translucent," when used to describe an article herein, refers to an article that has a haze greater than or equal to 25% and less than or equal to 50%. The term "opaque," when used to describe an article herein, refers to an article that has a haze greater than 50%.

In embodiments, the article comprises a haze less than 25%. For example, without limitation, the article may comprise a haze less than 25%, less than 20%, less than 15%, less than 10%, less than 5%, or even less than 1%.

In embodiments, the article comprises a haze greater than or equal to 25% and less than or equal to 50%. For example, without limitation, the article may comprise a haze greater than or equal to 25% and less than or equal to 50%, greater than or equal to 30% and less than or equal to 50%, greater than or equal to 35% and less than or equal to 50%, greater than or equal to 40% and less than or equal to 50%, greater than or equal to 45% and less than or equal to 50%, greater than or equal to 25% and less than or equal to 45%, greater than or equal to 25% and less than or equal to 40%, greater than 25% and less than or equal to 35%, greater than or equal to 25% and less than or equal to 30%, or any range or combination of ranges formed from these endpoints.

In embodiments, the article comprises a haze greater than 50%. For example, without limitation, the article may comprise a haze greater than 50%, greater than 55%, greater than 60%, greater than 65%, greater than 70%, greater than 75%, greater than 80%, greater than 85%, greater than 90%, greater than 95% or even greater than 99%.

In embodiments, the article comprises a haze less than or equal to 215% greater than a similar article lacking the alkyl silicone. For example, without limitation, the article may comprise a haze less than or equal to 215%, 210%, 205%, 200%, 195%, 190%, 185%, 180%, 175%, 170%, 165%, 160%, 155%, 150%, 145%, 140%, 135%, 130%, 125%, 120%, 115%, 110%, 105%, 100%, 95%, 90%, 85%, 80%, 75%, 70%, 65%, 60%, 55%, 50%, 45%, 40%, 35%, 30%, 25%, 20%, 15%, 10%, 5%, or even less than or equal to 0% greater than a similar article lacking the alkyl silicone. Haze may be measured according to ASTM D1003-21 Standard Test Method for Haze and Luminous Transmittance of Transparent Plastics-Procedure B (Spectrophotometer).

Articles formed from the polymer composition may be resistant to certain solvents, including polar solvents, such as ethanol, isopropanol, dimethyl sulfoxide (DMSO), and acetone. In embodiments, the articles may be free from compounds or compositions that are readily soluble in polar solvents. For example, the articles may be free from low molecular weight silicones that are soluble in polar solvents, such as ethanol, isopropanol, and DMSO, and acetone. Low molecular weight silicones may include silicones having a molecular weight of less than 1,000 g/mol. It should be noted that some silicones lacking extended alkyl chains in place of one or more methyl groups may have a molecular weight greater than 1,000 g/mol, but may also lack solvent resistance. As described herein, an article may be "solvent resistant" when contacting the article with the solvent does not substantially alter the chemistry that provides low fluid retention to the article during normal use. For example, a pipette tip may be "solvent resistant" when the pipette tip is used to draw and subsequently dispense a solvent, where the solvent does not chemically alter the composition of the pipette tip such that fluid retention is reduced.

In one or more embodiments, the article, after exposure to a polar solvent, comprises fluid retention greater than 90% less than a similar article lacking the alkyl silicone after exposure to the polar solvent. For example, the article, after exposure to a polar solvent, comprises fluid retention greater than 90%, 92%, 94%, 96%, 98%, or even 100% less than a similar article lacking the alkyl silicone after exposure to the polar solvent.

In some embodiments, the amount of fluid retention in a 200 μL pipette tip formed from the polymer compositions described herein, after exposure to a polar solvent, is less than or equal to 10.0 mg, 9.0 mg, 8.0 mg, 7.0 mg, 6.0 mg, 5.0 mg, 4.0 mg, 3.0 mg, 2.0 mg, 1.9 mg, 1.8 mg, 1.7 mg, 1.6 mg, 1.5 mg, 1.4 mg, 1.3 mg, 1.2 mg, 1.1 mg, 1.0 mg, 0.9 mg, 0.8 mg, 0.7 mg, 0.6 mg, 0.5, 0.4 mg, 0.3 mg, 0.2 mg, or 0.1 mg per 200 μL of a solution comprising 50 wt. % of glycerol, 40 wt. % McCormick® green food dye (or equivalent), and 10 wt. % deionized water, after a single aspirating dispensing cycle, as measured with gravimetric testing. In one specific embodiment, the amount of fluid retention in a 200 μL pipette tip formed from the polymer compositions described herein, after exposure to a polar solvent, is less than or equal to 6 mg per 200 μL of a solution comprising 50 wt. % of glycerol, 40 wt. % McCormick® green food dye (or equivalent), and 10 wt. % deionized water, after a single aspirate/dispense cycle, as measured with gravimetric testing.

Articles formed from the polymer composition may be sterilized by exposure to high-energy irradiation (i.e., gamma, x-ray, or e-beam). As used herein, a "sterilized" article means an article that has been exposed to high-energy irradiation (i.e., gamma rays, x-rays, or e-beam rays). The articles may retain low fluid retention properties after such high-energy irradiation exposure. The dose for sterilization by high-energy irradiation may be a dosage between 10 kGy and 50 kGy, or at any range or value therebetween. For example, the dose for sterilization by high-energy irradiation may be a dosage between 10 kGy and 40 kGy, between 10 kGy and 30 kGy, between 10 kGy and 20 kGy, between 20 kGy and 50 kGy, between 30 kGy and 50 kGy, between 40 kGy and 50 kGy, between 15 kGy and 40 kGy, between 15 kGy and 30 kGy, or between 15 kGy and 25 kGy. In another example, the dose for sterilization by high-energy irradiation may be 10, 11, 12, 13, 14, 15, 16, 17, 18, 19, 20, 21, 22, 22, 24, 25, 26, 27, 28, 29, 30, 31, 32, 33, 34, 35, 35, 26, 27, 38, 39, 40, 41, 42, 43, 44, 45, 46, 47, 48, 49, or 50 kGy.

In one or more embodiments, a sterilized article may have a fluid retention of less than or equal to 11% of a volume of fluid aspirated (or otherwise added) in the article and then dispensed (or otherwise discarded), or at any value or in any range between 11% and 0%. For example, a sterilized article in the form of a pipette tip may have a fluid retention of between 11% and 0%, between 10% and 0%, between 9% and 0%, between 8% and 0%, between 7% and 0%, between 6% and 0%, between 5% and 0%, between 4% and 0%, between 3% and 0%, between 2% and 0%, between 1% and 0%, or at any value or in any range therebetween. In one specific embodiment, the sterilized article of any of the foregoing may be sterilized by gamma irradiation. In another specific embodiment, the sterilized article may be sterilized by gamma irradiation with a dosage of 20 kGy.

In one or more embodiments, the article, after exposure to 20 kGy of high-energy irradiation may comprise a fluid retention greater than or equal to 10% less than a similar article lacking the alkyl silicone after exposure to the 20 kGy of the same type of high-energy irradiation. For example, the article, after exposure to 20 kGy of high-energy irradiation may comprise a fluid retention greater than or equal to 10%, 20%, 30%, 40%, 50%, 60%, 70%, 80%, 90%, or even 100% less than a similar article lacking the alkyl silicone after exposure to the 20 kGy of the same type of high-energy irradiation. In one specific embodiment, the sterilized article of any of the foregoing is sterilized by gamma irradiation.

In some embodiments, the amount of fluid retention in a 200 μL pipette tip formed from the polymer compositions described herein, after sterilization of the pipette tip with high energy irradiation at a dosage between 15 kGy and 50 kGy, is less than or equal to 10.0 mg, 9.0 mg, 8.0 mg, 7.0 mg, 6.0 mg, 5.0 mg, 4.0 mg, 3.0 mg, 2.0 mg, 1.9 mg, 1.8 mg, 1.7 mg, 1.6 mg, 1.5 mg, 1.4 mg, 1.3 mg, 1.2 mg, 1.1 mg, 1.0 mg, 0.9 mg, 0.8 mg, 0.7 mg, 0.6 mg, 0.5, 0.4 mg, 0.3 mg, 0.2 mg, or 0.1 mg per 200 μL of a solution comprising 50 wt. % of glycerol, 40 wt. % McCormick® green food dye (or equivalent), and 10 wt. % deionized water, after a single aspirating dispensing cycle, as measured with gravimetric testing. In one specific embodiment, the amount of fluid retention in a 200 μL pipette tip formed from the polymer compositions described herein, after sterilization of the pipette tip with high energy irradiation at a dosage between 15 kGy and 50 kGy, is less than or equal to 6 mg per 200 μL of a solution comprising 50 wt. % of glycerol, 40 wt. % McCormick® green food dye (or equivalent), and 10 wt. % deionized water, after a single aspirate/dispense cycle, as measured with gravimetric testing.

Articles formed from the polymer composition may have stable fluid retention properties over time. Ageing may be performed on the articles to show such stability by holding the articles at an elevated temperature for a period of time. For example, as described in more detail in the examples below, an article may be aged at a temperature of 55° C. for a time of two weeks. An aged article may be unsterilized or sterilized.

In one or more embodiments, an article aged for 14 days at 55° C. may have a fluid retention of less than or equal to 11% of a volume of fluid aspirated (or otherwise added) in the article and then dispensed (or otherwise discarded), or at any value or in any range between 11% and 0%. For example, an article in the form of a pipette tip aged for 14 days at 55° C. may have a fluid retention of between 11% and 0%, between 10% and 0%, between 9% and 0%, between 8% and 0%, between 7% and 0%, between 6% and 0%, between 5% and 0%, between 4% and 0%, between 3% and 0%, between 2% and 0%, between 1% and 0%, or at any value or in any range therebetween.

Likewise, in one or more embodiments, a sterilized article aged for 14 days at 55° C. may have a fluid retention of less than or equal to 11% of a volume of fluid aspirated (or otherwise added) in the article and then dispensed (or otherwise discarded), or at any value or in any range between 11% and 0%. For example, a sterilized article in the form of a pipette tip aged for 14 days at 55° C. may have a fluid retention of between 11% and 0%, between 10% and 0%, between 9% and 0%, between 8% and 0%, between 7% and 0%, between 6% and 0%, between 5% and 0%, between 4% and 0%, between 3% and 0%, between 2% and 0%, between 1% and 0%, or at any value or in any range therebetween.

In one or more embodiments, the article, after exposure to 20 kGy of high-energy irradiation and a temperature of 55° C. for two weeks, comprises a fluid retention greater than or equal to 0% less than a similar article lacking the alkyl silicone after exposure to the 20 kGy of the same type of high-energy irradiation and the temperature of 55° C. for two weeks. For example, the article, after exposure to 20 kGy of high-energy irradiation and a temperature of 55° C. for two weeks, comprises a fluid retention greater than or equal to 0%, 10%, 20%, 30%, 40%, 50%, 60%, 70%, 80%, 90%, or even 100% less than a similar article lacking the alkyl silicone after exposure to the 20 kGy of the same type of high-energy irradiation and the temperature of 55° C. for two weeks.

In some embodiments, the amount of fluid retention in a 200 μL pipette tip formed from the polymer compositions described herein, after sterilization of the pipette tip with high energy irradiation at a dosage between 15 kGy and 50 kGy and then 14 days in an oven at 55° C., is less than or equal to 10.0 mg, 9.0 mg, 8.0 mg, 7.0 mg, 6.0 mg, 5.0 mg, 4.0 mg, 3.0 mg, 2.0 mg, 1.9 mg, 1.8 mg, 1.7 mg, 1.6 mg, 1.5 mg, 1.4 mg, 1.3 mg, 1.2 mg, 1.1 mg, 1.0 mg, 0.9 mg, 0.8 mg, 0.7 mg, 0.6 mg, 0.5, 0.4 mg, 0.3 mg, 0.2 mg, or 0.1 mg per 200 μL of a solution comprising 50 wt. % of glycerol, 40 wt. % McCormick® green food dye (or equivalent), and 10 wt. % deionized water, after a single aspirating dispensing cycle, as measured with gravimetric testing. In one specific embodiment, the amount of fluid retention in a 200 μL pipette tip formed from the polymer compositions described herein, after sterilization of the pipette tip with high energy irradiation at a dosage between 15 kGy and 50 kGy and then 14 days in an oven at 55° C., is less than or equal to 6 mg per 200 μL of a solution comprising 50 wt. % of glycerol, 40 wt. % McCormick® green food dye (or equivalent), and 10 wt. % deionized water, after a single aspirate/dispense cycle, as measured with gravimetric testing.

Methods for forming articles comprising the polymer composition are not necessarily limited. In some embodiments, articles comprising the polymer composition may be formed by injection molding, blow molding, extrusion, compression molding, or any other suitable processes. In some embodiments, methods for forming an article comprising the polymer composition may comprise solidifying a polymer composition having the alkyl silicone within a mold to form an article comprising the polymer composition and removing the article from the mold. The polymer composition may be processed at a sufficient temperature and for a sufficient amount of time to ensure surface development of alkyl silicone included in the polymer composition.

In one or more embodiments, the polymer composition may be disposed into the mold. In such embodiments, the polymer composition is formed outside the mold and before it is disposed into the mold. The polymer composition may be formed by mixing the alkyl silicone, the thermoplastic polymer, and optionally, one or more additives, each of which are previously described. The polymer composition may then be disposed into the mold, and solidified within the mold to form an article comprising the polymer composition. In some embodiments, the polymer composition may be disposed into the mold in a single step. In such embodiments, alkyl silicone may undergo surface development and move toward the surface of the article as the polymer composition is disposed into the mold and solidifies within the mold to form the article.

In some embodiments, the polymer composition may be formed within the mold. In such embodiments, at least a portion of the mold may be coated with the alkyl silicone or a polymer composition comprising alkyl silicone, followed by disposing a thermoplastic polymer composition without alkyl silicone into the mold to form the final polymer composition. The mold may be coated by any suitable means. For example, the alkyl silicone or polymer composition comprising alkyl silicone may be sprayed onto at least a portion of the mold. Any optional additives present in the polymer composition may be present in the alkyl silicone or the thermoplastic polymer, or both. The polymer composition may then be solidified within the mold to form the article. In such embodiments, surface development of the alkyl silicone may be minimal, as the alkyl silicone is positioned near the eventual surface of the article when the polymer composition is formed within the mold.

In one or more embodiments, a method of forming an article 100 may comprise solidifying a thermoplastic polymer composition not having the alkyl silicone within a mold to form a substrate 110. The thermoplastic polymer composition may be formed outside the mold, before it is disposed into the mold. For example, the thermoplastic polymer composition may be formed by adding one or more thermoplastic polymers, and optionally, one or more additives, each of which are previously described. The thermoplastic polymer composition may then be disposed into the mold, and subsequently solidified within the mold to form the substrate 110. The substrate 110 may be removed from the mold. As previously described, the substrate 110 may comprise a first surface 112. At least a portion of the first surface 112 of the substrate 110 may be coated with an alkyl silicone or a polymer composition comprising silicone 120 to form an article 100. Any known coating method for coating onto a formed thermoplastic polymer may be used.

Examples

The embodiments described herein will be further clarified by the following examples.

Polymer Compositions

Polymer compositions comprising thermoplastic polymers and alkyl silicones were formed by blending thermoplastic polymers ("TP") and alkyl silicones ("AS"). The thermoplastic polymers and alkyl silicones used in the present Examples are listed in Table 1. The compositions of the Controls 1-5 and Compositions 1-26 are given in Table 2 (in wt. %).

TABLE 1

| Ingredients | Name | Chemical Description | | |
|---|---|---|---|---|
| Thermoplastic Polymer | TP-1 | Polypropylene Homopolymer | Melt Flow Rate: 35 g/10 min | Density: 0.90 g/cm$^3$ |
| | TP-2 | Polypropylene Homopolymer | Melt Flow Rate: 20 g/10 min | Density: 0.90 g/cm$^3$ |
| | TP-3 | Propylene Random Copolymer | Melt Flow Rate: 60 g/10 min. | Density: 0.90 g/cm$^3$ |
| | TP-4 | Propylene Ethylene Copolymer | — | Density: 0.86-0.88 g/cm$^3$ |
| Alkyl Silicone | AS-1 | Molecular Weight: 2,000 | | Dimethyl Silicone Content: 50% |
| | AS-2 | Molecular Weight: 10,000 | | Dimethyl Silicone Content: 65% |
| | AS-3 | Molecular Weight: 5,000 | | Dimethyl Silicone Content: 42% |

TABLE 2

| Polymer Compositions (wt. %) | TP-1 | TP-2 | TP-3 | TP-4 | AS-1 | AS-2 | AS-3 |
|---|---|---|---|---|---|---|---|
| Control 1 | 100 | — | — | — | — | — | — |
| Control 2 | — | 100 | — | — | — | — | — |
| Control 3 | — | — | 100 | | — | — | — |
| Control 4 | 95 | — | — | 5 | — | — | — |
| Control 5 | — | — | 95 | 5 | — | — | — |
| Composition 1 | 90 | — | — | — | 10 | — | — |
| Composition 2 | 95 | — | — | — | 5 | — | — |
| Composition 3 | 90 | — | — | — | — | 10 | — |
| Composition 4 | 90 | — | — | — | — | — | 10 |
| Composition 5 | 95 | — | — | — | — | — | 5 |
| Composition 6 | — | 95 | — | — | — | — | 5 |
| Composition 7 | — | 90 | — | — | — | — | 10 |
| Composition 8 | 95 | — | — | — | — | 5 | — |
| Composition 9 | — | 95 | — | — | — | 5 | — |
| Composition 10 | — | 90 | — | — | — | 10 | — |
| Composition 11 | — | 95 | — | — | 5 | — | — |
| Composition 12 | — | 90 | — | — | 10 | — | — |
| Composition 13 | — | — | 95 | — | — | — | 5 |
| Composition 14 | — | — | 90 | — | — | — | 10 |
| Composition 15 | — | — | 95 | — | 5 | — | — |
| Composition 16 | — | — | 90 | — | 10 | — | — |
| Composition 17 | — | — | 95 | — | — | 5 | — |
| Composition 18 | — | — | 90 | — | — | 10 | — |
| Composition 19 | 90 | — | — | 8 | 2 | — | — |
| Composition 20 | 90 | — | — | 7 | 3 | — | — |
| Composition 21 | 95 | — | — | 1 | 4 | — | — |
| Composition 22 | 90 | — | — | 5 | 5 | — | — |
| Composition 23 | — | — | 90 | 8 | 2 | — | — |
| Composition 24 | — | — | 90 | 7 | 3 | — | — |
| Composition 25 | — | — | 95 | 1 | 4 | — | — |
| Composition 26 | — | — | 93.75 | 1.25 | 5 | — | — |

Fluid Retention of Pinettes Tins Formed From the Polymer Compositions

The fluid retention of 200 μL pipette tips formed from polymer compositions of Compositions 1-4 was analyzed by the following process. Fluorescein sodium salt was added to a mixture of 70 vol. % ethanol and 30 vol. % cell culture grade water. The concentration of the fluorescein sodium salt was 1 μg/mL. The fluorescein mixture was poured into a clean reservoir.

Five pipette tips were loaded onto a manual multi-channel pipette. The five pipette tips were formed from polymer compositions Control 1 and Compositions 1-4 respectively. After the pipette tips were loaded onto the pipette, 100 μL of the fluorescein mixture was aspirated from the reservoir and subsequently dispensed back into the reservoir. The fluid remaining on each used tip surface was recovered in wash water by rinsing the used pipette tip three times with 100 μL of deionized water that was placed in one well of a 96-well plate. The triple-washed wash fluid in the 96-well plate was then read for arbitrary florescence units (AFUs) using a fluorescent plate reader at 480 nm. The fluorescence in AFUs was measured and documented. This aspirate, dispense, and rinse cycle was procedure was repeated two more times with the same pipette tip, for a total of three cycles for each pipette tip. The fluid retention as percentage fluorescence retention was calculated by dividing the AFU value for fluorescein in the used 100 μL rinse wash by the AFU value for 100 mL of the fluorescein mixture, and multiplying the resultant value by 100%. The percentage fluorescent retention for each aspirate/dispense cycle of each pipette tip is given in Table 3. Additionally, the percent difference of the percentage fluorescent retention of the pipette tips formed from the polymer compositions of Compositions 1-4 from the pipette tip formed from the polymer composition of Control 1 for each Aspirate/Dispense cycle is given in Table 3. The percent difference was calculated as follows: ((Composition Retention−Control Retention)/Control Retention)×100.

TABLE 3

| Polymer Composition | Aspirate/Dispense Cycle 1 | Aspirate/Dispense Cycle 2 | Aspirate/Dispense Cycle 3 |
|---|---|---|---|
| | Percentage Fluorescent Retention | | |
| Control 1 | 24.4% | 25.9% | 11.8% |
| Composition 1 | 1.6% | 4.8% | 4.9% |
| Composition 2 | 2.5% | 6.9% | 10.8% |
| Composition 3 | 2.0% | 3.5% | 8.3% |
| Composition 4 | 2.7% | 4.3% | 5.9% |
| | Percent Difference from Control 1 | | |
| Composition 1 | −93.4% | −81.5% | −58.5% |
| Composition 2 | −89.8% | −73.4% | −8.5% |
| Composition 3 | −91.8% | −86.5% | −29.7% |
| Composition 4 | −88.9% | −83.4% | −50% |

As shown in Table 3, the pipette tips formed from the polymer compositions of Compositions 1-4 showed reduced percent fluorescence retention over the pipette tip formed from the Control 1 polymer composition.

The fluid retention measurement process described above was repeated using 100 vol. % dimethyl sulfoxide in place of the mixture of 70 vol. % ethanol and 30 vol. % cell culture grade water and in place of the 100% water for the rinse. The fluid retention as percentage fluorescent retention for each aspirate/dispense cycle of each pipette tip is given in Table 4. Additionally, the percent difference of the percentage fluorescent retention of the pipette tips formed from the polymer compositions of Compositions 1-4 from the pipette tip formed from the polymer composition of Control 1 for each Aspirate/Dispense cycle is given in Table 4. The percent difference was calculated as follows: ((Composition Retention−Control Retention)/Control Retention)×100.

TABLE 4

| Polymer Composition | Aspirate/Dispense Cycle 1 | Aspirate/Dispense Cycle 2 | Aspirate/Dispense Cycle 3 |
|---|---|---|---|
| | Percentage Fluorescent Retention | | |
| Control 1 | 21.1% | 22.4% | 10.2% |
| Composition 1 | 1.4% | 4.2% | 4.3% |
| Composition 2 | 2.2% | 6.0% | 9.4% |
| Composition 3 | 1.7% | 3.0% | 7.2% |
| Composition 4 | 2.3% | 3.7% | 5.1% |
| | Percent Difference from Control 1 | | |
| Composition 1 | −93.4% | −81.3% | −57.8% |
| Composition 2 | −89.6% | −73.2% | −7.8% |
| Composition 3 | −91.9% | −86.6% | −29.4% |
| Composition 4 | −89.1% | −83.5% | −50.0% |

As shown in Table 4, the pipette tips formed from the polymer compositions of Compositions 1-4 showed reduced percent fluorescence retention over the pipette tip formed from the Control 1 polymer composition.

Next, the "volume of fluid retention" as described herein was measured as follows. Pipette tips formed from the polymer compositions of Controls 4 and 5 and Compositions 19-26 were measured for their volume of fluid retention using a standard solution of 50% glycerol, 40% green McCormick food coloring, and 10% cell culture grade water. 200 μL of the standard solution was drawn into each pipette tip and then dispensed from the pipette tip. Then the pipette tip was rinsed three times by aspirating 200 μL of a diluent provided by Artel. The fluorescence of the diluent used to rinse the pipette tip was measured using an Artel microplate reader. The volume of the solution retained by the pipette tip was calculated using a standard curve generated on the Artel microplate reader using serial dilutions of the standard solution in the diluent. The volume of fluid retention of each pipette tip is given in Tables 5 and 6. The data in Tables 5 and 6 is presented as the mean±the standard deviation, n=24 per group.

Additionally, the percent difference of the volume of fluid retention of the pipette tips formed from the polymer compositions of Compositions 19-26 from the pipette tips formed from the polymer compositions of Controls 4 and 5 are included in Table 6. The percent difference was calculated as follows: ((Composition Retention−Control Retention)/Control Retention)×100.

TABLE 5

| Polymer Composition | |
|---|---|
| | Volume of Fluid Retention |
| Control 4 | 25.63 ± 1.69 μL |
| Composition 19 | 2.79 ± 1.28 μL |
| Composition 20 | 3.71 ± 2.95 μL |
| Composition 21 | 4.29 ± 2.14 μL |
| Composition 22 | 2.06 ± 0.92 μL |
| | Percent Difference |
| Composition 19 | −89.1% |
| Composition 20 | −85.5% |
| Composition 21 | −83.3% |
| Composition 22 | −92.0% |

TABLE 6

| Polymer Composition | |
|---|---|
| | Volume of Fluid Retention |
| Control 5 | 24.84 ± 2.76 μL |
| Composition 23 | 1.82 ± 0.89 μL |
| Composition 24 | 1.64 ± 0.87 μL |
| Composition 25 | 2.96 ± 2.35 μL |
| Composition 26 | 1.33 ± 0.88 μL |

TABLE 6-continued

| Polymer Composition | Percent Difference |
|---|---|
| Composition 23 | −92.7% |
| Composition 24 | −93.4% |
| Composition 25 | −88.1% |
| Composition 26 | −94.6% |

As shown in Tables 5 and 6, pipette tips formed from the polymer compositions of Compositions 19-22 and 23-26 had lower volumes of fluid retention that the pipette tips formed from the polymer compositions of Controls 4 and 5, respectively.

Haze of Articles formed from the Polymer Compositions

Articles having a thickness of 1 mm were formed from polymer compositions of Compositions 3-18 and Control 1, 2, and 3. The haze of each sample was measured according to ASTM D1003-21 Standard Test Method for Haze and Luminous Transmittance of Transparent Plastics—Procedure B (Spectrophotometer). The results are given in Table 7. Table 7 also gives the percent difference of the haze of the articles formed from the polymer compositions of Compositions 3-5 and 8 from the article formed from the polymer composition of Control 1, the percent difference of the haze of the articles formed from the polymer compositions of Compositions 6-7 and 9-12 from the article formed from the polymer composition of Control 2, and the percent difference of the haze of the articles formed from the polymer compositions of Compositions 13-18 from the article formed from the polymer composition of Control 3. Compositions 1, 3-5, and 8 were compared to Control 1 because the Control 1 and Compositions 1, 3-5, and 8 comprise the same thermoplastic polymer. Compositions 6-7 and 9-12 were compared to Control 2 because Control 2 and Compositions 6-7 and 9-12 comprise the same thermoplastic polymer, and Compositions 13-18 were compared to Control 3 because Control 3 and Compositions 13-18 comprise the same thermoplastic polymer, as shown in Table 2. The percent difference was calculated as follows: ((Composition Haze−Control Haze)/Control Haze)×100.

TABLE 7

| Polymer Composition | Haze % | Percent Difference from Control 1 | Percent Difference from Control 2 | Percent Difference from Control 3 |
|---|---|---|---|---|
| Control 1 | 58.4 | — | — | — |
| Control 2 | 55.0 | — | — | — |
| Control 3 | 26.7 | — | — | — |
| Composition 3 | 85.9 | 47.09% | — | — |
| Composition 4 | 50.4 | −13.70% | — | — |
| Composition 5 | 49.6 | −15.07% | — | — |
| Composition 6 | 44.6 | — | −18.91% | — |
| Composition 7 | 67.7 | — | 23.09% | — |
| Composition 8 | 67.7 | 15.92% | — | — |
| Composition 9 | 58.1 | — | 5.64% | — |
| Composition 10 | 81.0 | — | 47.27% | — |
| Composition 11 | 56.7 | — | 3.09% | — |
| Composition 12 | 69.6 | — | 26.55% | — |
| Composition 13 | 27.8 | — | — | 4.12% |
| Composition 14 | 30.3 | — | — | 13.48% |
| Composition 15 | 30.2 | — | — | 13.11% |

TABLE 7-continued

| Polymer Composition | Haze % | Percent Difference from Control 1 | Percent Difference from Control 2 | Percent Difference from Control 3 |
|---|---|---|---|---|
| Composition 16 | 35.7 | — | — | 33.04% |
| Composition 17 | 70.5 | — | — | 164.04% |
| Composition 18 | 84.1 | — | — | 214.98% |

As shown in Table 7, the polymer compositions of Compositions 3, 8-10, and 17-18 including alkyl silicone AS-2 generally had a greater haze than the polymer compositions of Compositions 4-7 and 13-14 including the alkyl silicone AS-3 or Compositions 11 and 15-16 including the alkyl silicone AS-1. The polymer compositions of Compositions 4-9, 11-12, and 13-16 generally had a haze similar to the haze of the articles formed from the Control 1, 2, and 3 polymer compositions. Specifically, the articles formed from the polymer compositions of Compositions 4-9, 11-12, and 13-16 had hazes from −18.91% to 33.04% of the haze of the articles formed from the corresponding control polymer composition. The articles formed from the polymer compositions of Compositions 3, 10, and 17-18 had hazes from about 47.09% to 214.98% greater than the haze of the articles formed from the corresponding control polymer composition.

Volume of Fluid Retention of Pipette Tips After Solvent Exposure

The volume of fluid retention of pipette tips formed from the polymer compositions of Control 3 and Compositions 13 and 14 were analyzed after exposing the pipette tips to solvents according to the following process. Each pipette tip was exposed to a solvent for a time of 5 second by aspirating 200 μL of solvent into the pipette tip and discharging the solvent from the pipette tip 5 seconds later. The pipette tip was dried at room temperature for 24 hours to allow any residual solvent to evaporate. Pipette tips were exposed to 100% isopropanol (IPA), 100% ethanol (EtOH), and 100% dimethyl sulfoxide (DMSO). Some pipette tips were not exposed to solvent prior to the fluid retention measurement described below.

The volume of fluid retention of the pipette tips was measured using a standard solution of 50% glycerol, 40% green McCormick food coloring, and 10% cell culture grade water. 200 μL of the standard solution was drawn into each pipette tip and then dispensed from the pipette tip. Then the pipette tip was rinsed three times by aspirating 200 μL of a diluent provided by Artel. The fluorescence of the diluent used to rinse the pipette tip was measured using an Artel microplate reader. The volume of the solution retained by the pipette tip was calculated using a standard curve generated on the Artel microplate reader using serial dilutions of the standard solution in the diluent. The volume of fluid retention of each pipette tip is given in Table 8. The data in Table 8 is presented as the mean±the standard deviation, n=10 per group.

Additionally, the percent difference of the fluid retention of the pipette tips formed from the polymer compositions of Compositions 13 and 14 from the pipette tip formed from the polymer composition of Control 3 before and after exposure to each solvent are included in Table 8. The percent difference was calculated as follows: ((Composition Retention−Control Retention)/Control Retention)×100.

TABLE 8

| Polymer Composition | No Solvent | IPA | EtOH | DMSO |
|---|---|---|---|---|
| | Volume of Fluid Retention | | | |
| Control 3 | 9.8 ± 1.5 μL | 10.3 ± 1.5 μL | 10.3 ± 1.1 μL | 11.0 ± 0.1 μL |
| Composition 13 | 1.8 ± 1.2 μL | 0.9 ± 0.5 μL | 0.6 ± 0.3 μL | 1.1 ± 0.3 μL |
| Composition 14 | 0.5 ± 0.5 μL | 1.0 ± 1.0 μL | 0.3 ± 0.4 μL | 0.3 ± 0.2 μL |
| | Percent Difference | | | |
| Composition 13 | −81.6% | −91.3% | −94.2% | −90.0% |
| Composition 14 | −94.9% | −90.3% | −97.1% | −97.3% |

As shown in Table 8, the volume of fluid retention of the pipette tips formed from the polymer composition of Control 3 increased due to solvent exposure. The volume of fluid retention of the pipette tips formed from the polymer composition of Composition 13 decreased after solvent exposure to IPA, EtOH, and DMSO. The volume of fluid retention of the pipette tips formed from the polymer composition of Composition 14 decreased after solvent exposure to EtOH and DMSO, but increased after solvent exposure to IPA. However, the pipette tips formed from the composition of Compositions 13 and 14 consistently had lower volumes of fluid retention than the pipette tip formed from the composition of Control 3.

Sterilization and Ageing of Pipette Tips

The amount of fluid retention of 200 μL pipette tips formed from the polymer compositions of Control 3 and Compositions 13-18 were analyzed after sterilizing the pipette tips by exposure to gamma radiation. Pipette tips were exposed to a dose of 20 kGy to sterilize the pipette tips. Then the amount of fluid retention of the sterilized pipette tips was measured by gravimetric analysis. The mass of an empty pipette tip was measured, and the value was recorded as the dry pipette tip mass. Then 200 μL of the standard solution (50% glycerol, 40% green McCormick food coloring, and 10% cell culture grade water) was drawn into and dispensed from the pipette tip. The mass of the pipette tip was immediately measured, and the value was recorded as the wet pipette tip mass. The amount of fluid retention of the pipette tip is the difference in mass between the dry pipette tip and the wet pipette tip immediately after dispensing the standard solution. The fluid retention of the sterilized pipette tips is given in Table 9. Additionally, the amount of fluid retention of pipette tips that did not undergo the sterilization process is given in Table 9 for comparison. The data in Table 9 is presented as the mean±the standard deviation, n=10 per group.

The amount of fluid retention of pipette tips formed from the polymer compositions of Control 3 and Compositions 13-18 were analyzed after sterilizing and ageing the pipette tips. Pipette tips were sterilized with gamma radiation and previously described. Then, the pipette tips were exposed to a temperature of 55° C. for two weeks. The pipette tips were cooled to room temperature over a period of 24 hours. Then, the amount of fluid retention of the pipette tips was measured by the previously described gravimetric analysis. The amount of fluid retention of the sterilized and aged pipette tips is also included in Table 9.

Additionally, the percent difference of the amount of fluid retention of the pipette tips formed from the polymer compositions of Compositions 13-18 from the pipette tip formed from the polymer composition of Control 3 for each sterilization and ageing treatment is given in Table 9. The percent difference was calculated as follows: ((Composition Retention−Control Retention)/Control Retention)×100.

TABLE 9

| Polymer Composition | Untreated | Sterilized | Sterilized and Aged |
|---|---|---|---|
| | Amount of Fluid Retention | | |
| Control 3 | 8.3 ± 1.1 mg | 6.3 ± 0.3 mg | 11.0 ± 1.5 mg |
| Composition 13 | 0.7 ± 0.2 mg | 0.3 ± 0.3 mg | 0.1 ± 0.1 mg |
| Composition 14 | 0.8 ± 0.5 mg | 0.3 ± 0.2 mg | 0.4 ± 0.4 mg |
| Composition 15 | 1.7 ± 0.5 mg | 3.1 ± 0.6 mg | 5.0 ± 0.5 mg |
| Composition 16 | 1.4 ± 1.3 mg | 2.6 ± 0.3 mg | 5.6 ± 0.6 mg |
| Composition 17 | 8.1 ± 1.5 mg | 5.6 ± 1.0 mg | 11.0 ± 1.8 mg |
| Composition 18 | 3.6 ± 1.0 mg | 2.2 ± 0.9 mg | 8.4 ± 0.6 mg |
| | Percent Difference | | |
| Composition 13 | −91.6% | −95.2% | −99.1% |
| Composition 14 | −90.4% | −95.2% | −96.4% |
| Composition 15 | −79.5% | −50.8% | −54.5% |
| Composition 16 | −83.1% | −58.7% | −49.1% |
| Composition 17 | −2.4% | −11.1% | 0.0% |
| Composition 18 | −56.6% | −65.1% | −23.6% |

As shown in Table 9, the pipette tips formed from the polymer compositions of Compositions 13-18 showed reduced amounts of fluid retention over the pipette tip formed from the Control 3 polymer composition after sterilization and after sterilization and ageing.

Concentration of Alkyl Silicone at the Surface of Pipette Tips

Figure 2B:
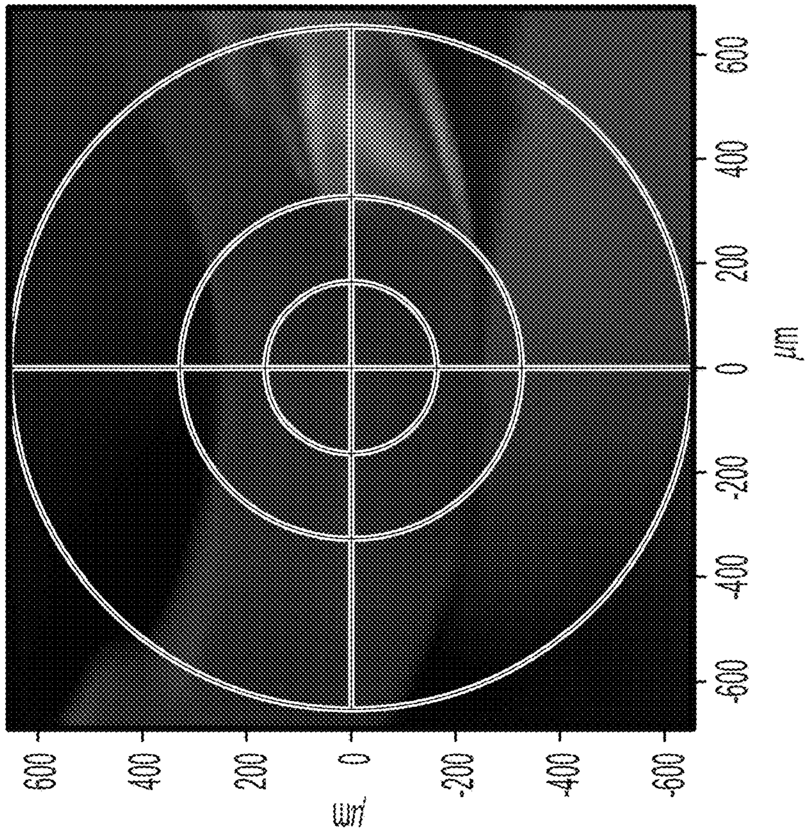
FIG. 2B is high magnification image of another portion of the bulk of the pipette tip of FIG. 2A.
Figure 2A:
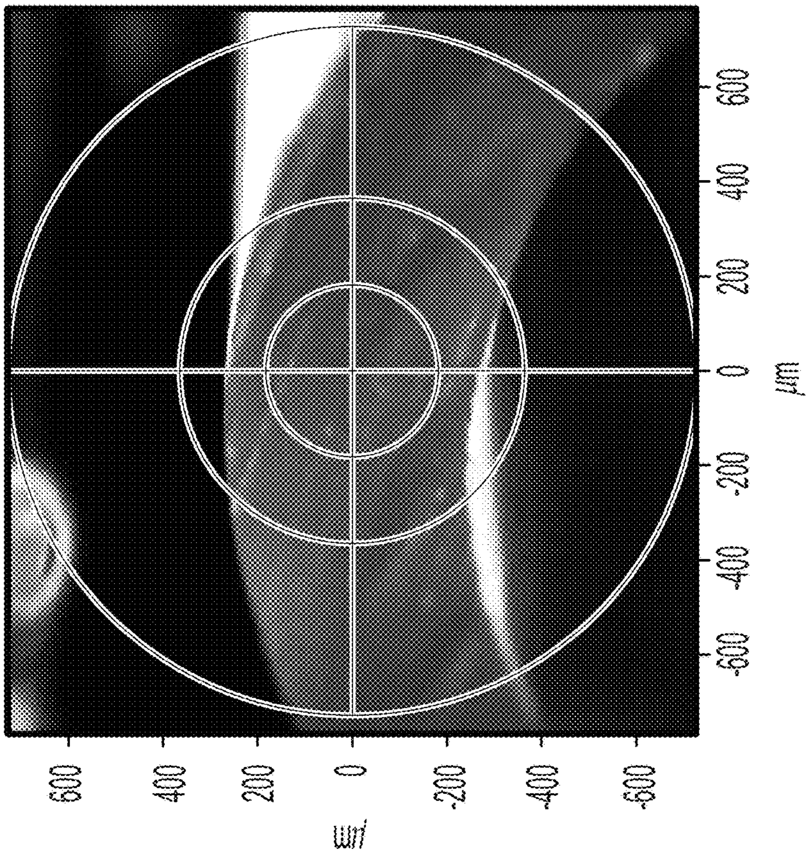
FIG. 2A is high magnification image of a portion of a bulk of a pipette tip, according to one or more embodiments of the present disclosure.
Figure 3A:
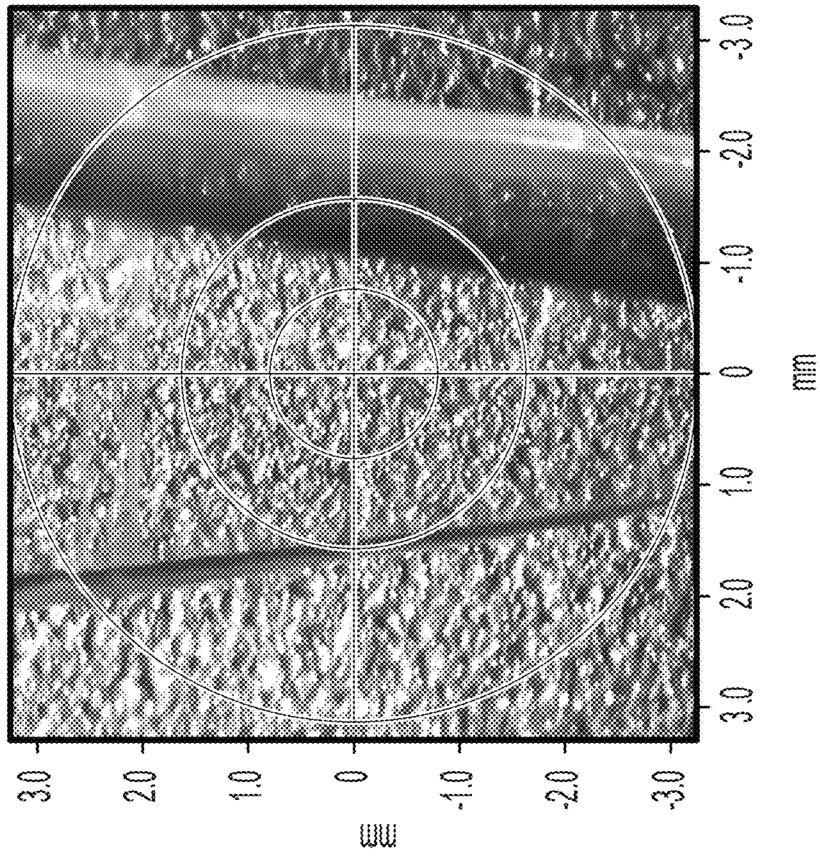
FIG. 3A is high magnification image of a portion of an interior surface of the pipette tip of FIG. 2A.
Figure 3B:
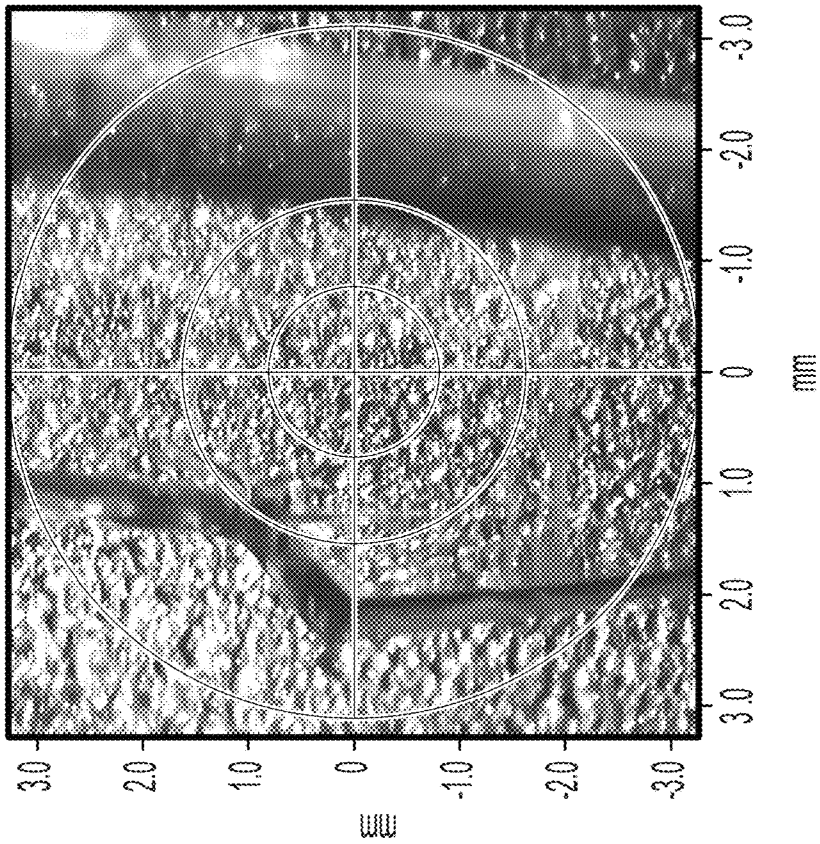
FIG. 3B is high magnification image of another portion of the interior surface of the pipette tip of FIG. 2A.

The composition at the interior surface and within the bulk of a pipette tip formed from the polymer composition of Composition 16 was measured by x-ray photoelectron spectroscopy (XPS). The pipette tip was exposed to liquid nitrogen and fractured to expose the bulk of the pipette tip for analysis. Two portions of the bulk of the pipette tip on the fracture, near the midpoint between the inner surface and the outer surface of the pipette tip were selected for analysis. For each portion, the composition of a 110 μm area with a depth of 10 nm was measured by XPS. The selected portions are depicted in FIGS. 2A and 2B. The composition of each portion in the bulk of the pipette tip is given in Table 10. Two spots on the interior surface of the pipette tip, each having an area of 110 μm and a depth of 10 nm, were also analyzed by XPS. The selected spots are depicted in FIGS. 3A and 3B. The composition of each spot on the surface of the pipette tip is given in Table 10.

TABLE 10

| | | Atom % | | |
|---|---|---|---|---|
| | | Carbon | Oxygen | Silicon |
| Bulk | Portion 1 | 98.9 | 0.7 | 0.4 |
| | Portion 2 | 97.2 | 1.8 | 0.9 |
| Surface | Portion 1 | 82.8 | 8.6 | 8.5 |
| | Portion 2 | 84.7 | 7.0 | 8.3 |

As shown in Table 10, the amount of silicon at the surface of the pipette tip was greater than the amount of silicon within the bulk of the pipette tip. This shows that the alkyl silicone undergoes surface development during manufacturing and migrates toward the surface of the pipette tips.

Protein and DNA Recovery From Pipette Tips

The protein recovery of pipette tips formed from the polymer compositions of Control 1 and Composition 14 was measured. 200 μL of a bovine serum albumin (BSA) sample (5 μg/ml) was draw into each pipette tip. The BSA sample was held in the pipette tip for 10 minutes and then dispensed from the pipette tip. The protein remaining in the BSA sample after being dispensed from the pipette tip was measured by a microBCA assay. The protein remaining in the BSA sample after being dispensed from the pipette tip relative to the protein concentration of the initial BSA sample, referred to as "protein recovery," was calculated. The results are included in Table 11.

Additionally, the percent difference of the protein recovery of the pipette tips formed from the polymer compositions of Composition 14 from the pipette tip formed from the polymer composition of Control 1 is given in Table 11. The percent difference was calculated as follows: ((Composition Recovery−Control Recovery)/Control Recovery)×100.

TABLE 11

| Composition | |
|---|---|
| | Protein Recovery |
| Control 1 | 62% |
| Composition 14 | 71% |
| | Percent Difference from Control 1 |
| Composition 14 | 14.5% |

As shown in Table 11, the pipette tips formed from the polymer composition of Composition 14 had a greater protein recovery than the pipette tip formed from the polymer composition of Control 1.

The DNA recovery of the pipette tips formed from the polymer compositions of Control 1 and Composition 14 was also measured. 200 of μL of a salmon sperm DNA sample was draw into each pipette tip. The salmon sperm DNA had about 80 to 500 base pairs and the concentration of the salmon sperm DNA was 20 ng/ml. The sample was held in the pipette tip for 10 minutes and then dispensed from the pipette tip. The salmon sperm DNA remaining in the sample after being dispensed from the pipette tip was measured using a Qubit HS dsDNA assay kit. The salmon sperm DNA remaining in the sample after being dispensed from the pipette tip relative to the concentration of the salmon sperm DNA in the initial salmon sperm DNA sample, referred to as "DNA recovery," was calculated. The results are included in Table 12. Note that the baseline of the DNA recovery was shifted, resulting in DNA recovery greater than 100%.

However, one skilled in the art would appreciate that this example may be used for comparative purposes.

TABLE 12

| Composition | |
|---|---|
| | DNA Recovery |
| Control 1 | 111% |
| Composition 14 | 109% |
| | Percent Difference from Control 1 |
| Composition 14 | −1.8% |

As shown in Table 12, pipette tips formed from the polymer composition of Composition 14 had a maintained DNA recovery as compared to the pipette tip formed from the polymer composition of Control 1.

The present disclosure is directed to various embodiments of polymer compositions and articles formed from the polymer composition. The polymer compositions may comprise alkyl silicone and a thermoplastic polymer. The alkyl silicone may have a molecular weight greater than or equal to 1,000 g/mol and less than or equal to 10,000 g/mol and a dimethyl silicone content greater than or equal 40 wt. % and less than or equal to 70 wt. %, based on a total weight of the alkyl silicone. The specified molecular weight and silicone content of the alkyl silicones may lead to compatibility with the thermoplastic polymer, decreasing haze and ensuring separation from the thermoplastic polymer and surface development during manufacturing, leading to low fluid retention. The articles formed from the polymer composition may be free or substantially free from fluorinated compounds while having a low fluid retention. Articles formed from the polymer composition may also be resistant to solvents, such as isopropanol.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A pipette tip, comprising:

a polymer composition, the polymer composition comprising, based on a total weight of the polymer composition:

greater than or equal to 0.5 wt. % and less than or equal to 20 wt. % alkyl silicone, the alkyl silicone comprising:

a molecular weight greater than or equal to 1,000 g/mol and less than or equal to 10,000 g/mol; and a dimethyl silicone content greater than or equal 40 wt. % and less than or equal to 70 wt. %, based on a total weight of the alkyl silicone; and a thermoplastic polymer;

wherein the pipette tip comprises a fluid retention less than or equal to 11%, as measured by fluorescence after a single aspirate/dispense cycle, using a fluorescein sodium salt at a concentration of 1 μg/mL.

2. The pipette tip of claim 1, wherein the pipette tip comprises a first major surface and a second major surface opposite the first major surface, wherein a concentration of the alkyl silicone at a depth from 0 nm to 10 nm from the first major surface is greater than a concentration of the alkyl silicone at a midpoint between the first major surface and the second major surface.

3. The pipette tip of claim 1, wherein the polymer composition comprises greater than or equal to 75 wt. % and less than or equal to 99.5 wt. % of the thermoplastic polymer and greater than or equal to 1 wt. % and less than or equal to 15 wt. % of the alkyl silicone; and wherein the alkyl silicone comprises $C_8$-$C_{45}$ alkyl groups.

4. The pipette tip of claim 3, wherein the thermoplastic polymer comprises one or more of polypropylene, polystyrene, polymethylmethacrylate, polyvinyl chloride, polycarbonate, polysulfone, polyester, polyamide, polystyrene butadiene copolymers, fully hydrogenated styrenic polymers, polyurethanes, polyethylene, polymethyl pentene, polylactic acid, polybutylene succinate, and polyhydroxyalkanoate.

5. The pipette tip of claim 4, wherein the pipette tip is substantially free of fluorine.

6. The pipette tip of claim 1, wherein the pipette tip is solvent resistant such that, a fluid retention of the pipette tip is less than or equal to 11% of an aspirated volume, as measured by fluorescence after three aspirate/dispense cycles with a polar solvent, with a five second hold time before each dispense, using a fluorescein sodium salt at a concentration of 1 μg/mL.

7. The pipette tip of claim 6, wherein the polar solvent is selected from the group consisting of ethanol, isopropyl alcohol, and dimethyl sulfoxide.

8. The pipette tip of claim 1, wherein the pipette tip comprises a haze less than 25%, as measured by ASTM D1003-21 with a spectrophotometer and a 1 mm thick sample.

9. The pipette tip of claim 1, wherein the pipette tip comprises a haze greater than or equal to 25% and less than or equal to 50%, as measured by ASTM D1003-21 with a spectrophotometer and a 1 mm thick sample.

10. The pipette tip of claim 1, wherein the pipette tip comprises a haze greater than 50%, as measured by ASTM D1003-21 with a spectrophotometer and a 1 mm thick sample.

11. A pipette tip, comprising:

a polymer composition, the polymer composition comprising, based on a total weight of the polymer composition:

greater than or equal to 0.5 wt. % and less than or equal to 20 wt. % alkyl silicone, the alkyl silicone comprising:

a molecular weight greater than or equal to 1,000 g/mol and less than or equal to 10,000 g/mol; and a dimethyl silicone content greater than or equal 40 wt. % and less than or equal to 70 wt. %, based on a total weight of the alkyl silicone; and a thermoplastic polymer;

wherein the pipette tip is solvent resistant such that, a fluid retention of the pipette tip is less than or equal to 11%, as measured by fluorescence after three aspirate/dispense cycles with a polar solvent, with a five second hold time before each dispense, using a fluorescein sodium salt at a concentration of 1 μg/mL.

12. The pipette tip of claim 11, wherein the polar solvent is selected from the group consisting of ethanol, isopropyl alcohol, and dimethyl sulfoxide.

13. The pipette tip of claim 12, wherein the polymer composition comprises greater than or equal to 75 wt. % and less than or equal to 99.5 wt. % of the thermoplastic polymer and greater than or equal to 1 wt. % and less than or equal to 15 wt. % of the alkyl silicone; and wherein the alkyl silicone comprises $C_8$-$C_{45}$ alkyl groups.

14. The pipette tip of claim 13, wherein the thermoplastic polymer comprises one or more of polypropylene, polystyrene, polymethylmethacrylate, polyvinyl chloride, polycarbonate, polysulfone, polyester, polyamide, polystyrene butadiene copolymers, fully hydrogenated styrenic polymers, polyurethanes, polyethylene, polymethyl pentene, polylactic acid, polybutylene succinate, and polyhydroxyalkanoate.

15. The pipette tip of claim 12, wherein the pipette tip comprises a first major surface and a second major surface opposite the first major surface, wherein a concentration of the alkyl silicone at a depth from 0 nm to 10 nm from the first major surface is greater than a concentration of the alkyl silicone at a midpoint between the first major surface and the second major surface.

16. The pipette tip of claim 11, wherein the pipette tip is substantially free of fluorine.

17. A pipette tip, comprising:

a polymer composition, the polymer composition comprising, based on a total weight of the polymer composition:

greater than or equal to 0.5 wt. % and less than or equal to 20 wt. % alkyl silicone, the alkyl silicone comprising:

a molecular weight greater than or equal to 1,000 g/mol and less than or equal to 10,000 g/mol; and a dimethyl silicone content greater than or equal 40 wt. % and less than or equal to 70 wt. %, based on a total weight of the alkyl silicone; and a thermoplastic polymer;

wherein the pipette tip comprises a haze less than or equal to 50%, as measured by ASTM D1003-21 with a spectrophotometer and a 1 mm thick sample.

18. The pipette tip of claim 17, wherein the polymer composition comprises greater than or equal to 75 wt. % and less than or equal to 99.5 wt. % of the thermoplastic polymer and greater than or equal to 1 wt. % and less than or equal to 15 wt. % of the alkyl silicone; and wherein the alkyl silicone comprises $C_8$-$C_{45}$ alkyl groups.

19. The pipette tip of claim 18, wherein the thermoplastic polymer comprises one or more of polypropylene, polystyrene, polymethylmethacrylate, polyvinyl chloride, polycarbonate, polysulfone, polyester, polyamide, polystyrene butadiene copolymers, fully hydrogenated styrenic polymers, polyurethanes, polyethylene, polymethyl pentene, polylactic acid, polybutylene succinate, and polyhydroxyalkanoate.

20. The pipette tip of claim 17, wherein the pipette tip comprises a first major surface and a second major surface opposite the first major surface, wherein a concentration of the alkyl silicone at a depth from 0 nm to 10 nm from the first major surface is greater than a concentration of the alkyl silicone at a midpoint between the first major surface and the second major surface.

21. The pipette tip of claim 17, wherein the pipette tip is solvent resistant such that, a fluid retention of the pipette tip is less than or equal to 11% of an aspirated volume, as measured by fluorescence after three aspirate/dispense cycles with a polar solvent, with a five second hold time before each dispense, using a fluorescein sodium salt at a concentration of 1 μg/mL.

22. The pipette tip of claim 21, wherein the polar solvent is selected from the group consisting of ethanol, isopropyl alcohol, and dimethyl sulfoxide.

23. The pipette tip of claim 17, wherein the pipette tip is substantially free of fluorine.

24. A pipette tip, comprising:

a polymer composition, the polymer composition comprising, based on a total weight of the polymer composition:

greater than or equal to 0.5 wt. % and less than or equal to 20 wt. % alkyl silicone, the alkyl silicone comprising:

a molecular weight greater than or equal to 1,000 g/mol and less than or equal to 10,000 g/mol; and a dimethyl silicone content greater than or equal 40 wt. % and less than or equal to 70 wt. %, based on a total weight of the alkyl silicone; and a thermoplastic polymer;

wherein the pipette tip is a 200 μL pipette tip and comprises an amount of fluid retention less than or equal to 4 mg after a single aspirate/dispense cycle with 200 μL of fluid, as measured by gravimetric testing.

25. The pipette tip of claim 24, wherein the polymer composition comprises greater than or equal to 75 wt. % and less than or equal to 99.5 wt. % of the thermoplastic polymer and greater than or equal to 1 wt. % and less than or equal to 15 wt. % of the alkyl silicone; and wherein the alkyl silicone comprises $C_8$-$C_{45}$ alkyl groups.

26. The pipette tip of claim 25, wherein the thermoplastic polymer comprises one or more of polypropylene, polystyrene, polymethylmethacrylate, polyvinyl chloride, polycarbonate, polysulfone, polyester, polyamide, polystyrene butadiene copolymers, fully hydrogenated styrenic polymers, polyurethanes, polyethylene, polymethyl pentene, polylactic acid, polybutylene succinate, and polyhydroxyalkanoate.

27. The pipette tip of claim 24, wherein the pipette tip comprises a first major surface and a second major surface opposite the first major surface, wherein a concentration of the alkyl silicone at a depth from 0 nm to 10 nm from the first major surface is greater than a concentration of the alkyl silicone at a midpoint between the first major surface and the second major surface.

28. The pipette tip of claim 24, wherein the pipette tip is solvent resistant such that, a fluid retention of the pipette tip is less than or equal to 4 mg after three aspirate/dispense cycles with a polar solvent and a five second hold time before each dispense occurs, as measured by gravimetric testing, and wherein the polar solvent is selected from the group consisting of ethanol, isopropyl alcohol, and dimethyl sulfoxide.

29. The pipette tip of claim 24, wherein the pipette tip is substantially free of fluorine.

* * * * *